US010178348B2

(12) United States Patent
Nagamine et al.

(10) Patent No.: US 10,178,348 B2
(45) Date of Patent: Jan. 8, 2019

(54) INFORMATION PROCESSING APPARATUS, IMAGE DISPLAY METHOD, AND COMMUNICATION SYSTEM

(71) Applicants: Shoh Nagamine, Kanagawa (JP); Takuya Imai, Tokyo (JP); Kenichiro Morita, Tokyo (JP)

(72) Inventors: Shoh Nagamine, Kanagawa (JP); Takuya Imai, Tokyo (JP); Kenichiro Morita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/218,256

(22) Filed: Jul. 25, 2016

(65) Prior Publication Data

US 2017/0034482 A1 Feb. 2, 2017

(30) Foreign Application Priority Data

Jul. 28, 2015 (JP) .................................. 2015-148657

(51) Int. Cl.
*H04N 7/14* (2006.01)
*H04N 7/15* (2006.01)

(52) U.S. Cl.
CPC ............... *H04N 7/15* (2013.01); *H04N 7/147* (2013.01)

(58) Field of Classification Search
None
See application file for complete search history.

(56) References Cited

U.S. PATENT DOCUMENTS

| 8,421,840 | B2 | 4/2013 | Eleftheriadis et al. |
| 8,769,001 | B2 | 7/2014 | Ohwada |
| 2005/0099492 | A1 | 5/2005 | Orr |
| 2008/0034104 | A1* | 2/2008 | Kariti ..................... G06Q 10/10 709/231 |

(Continued)

FOREIGN PATENT DOCUMENTS

| JP | 2011-205612 | 10/2011 |
| JP | 2013-531934 | 8/2013 |

(Continued)

OTHER PUBLICATIONS

Extended European Search Report dated Jan. 5, 2017 in Patent Application No. 16181238.3.

*Primary Examiner* — Maria El-Zoobi
(74) *Attorney, Agent, or Firm* — Oblon, McClelland, Maier & Neustadt, L.L.P.

(57) ABSTRACT

An information processing apparatus includes a receiver configured to receive images from other information processing apparatuses via a network; a band information acquirer configured to acquire reception band information of the receiver; a first display number determiner configured to determine a first number of the images to be displayed on a display device according to the reception band information; a second display number determiner configured to determine the first number as a second number of the images to be displayed on the display device, when the reception band information is stable, and determine a present number of the images presently displayed on the display device, as the second number, when the reception band information is unstable; and a display processor configured to display the second number of the one or more images on the display device.

10 Claims, 16 Drawing Sheets

(56) References Cited

U.S. PATENT DOCUMENTS

| | | | |
|---|---|---|---|
| 2008/0062877 A1* | 3/2008 | Chen | H04L 47/10 370/235 |
| 2010/0315484 A1 | 12/2010 | Ramanathan et al. | |
| 2011/0292161 A1 | 12/2011 | Sharon et al. | |
| 2012/0200658 A1* | 8/2012 | Duckworth | H04N 7/152 348/14.07 |
| 2013/0135427 A1* | 5/2013 | Wu | H04N 21/23655 348/14.09 |
| 2013/0182186 A1* | 7/2013 | Ikenaga | H04N 5/38 348/723 |
| 2015/0067543 A1 | 3/2015 | Mo | |
| 2015/0092014 A1 | 4/2015 | Kariti et al. | |

FOREIGN PATENT DOCUMENTS

| | | |
|---|---|---|
| JP | 5497020 | 5/2014 |
| WO | WO 2012/145340 A2 | 10/2012 |
| WO | WO 2014/208569 A1 | 12/2014 |

\* cited by examiner

INFORMATION PROCESSING APPARATUS, IMAGE DISPLAY METHOD, AND COMMUNICATION SYSTEM

CROSS-REFERENCE TO RELATED APPLICATION

The present application claims the benefit of priority under 35 U.S.C. § 119 of Japanese Patent Application No. 2015-148657, filed on Jul. 28, 2015, the contents of which are incorporated herein by reference in their entirety.

BACKGROUND OF THE INVENTION

1. Field of the Invention

The present invention relates to an information processing apparatus, an image display method, and a communication system.

2. Description of the Related Art

There is known a TV conference as an example of a transmission system for holding a TV conference among a plurality of terminal devices via a communication network such as the Internet. In such a TV conference system, image data and voice sound data, which are collected during a TV conference at one transmitting terminal, are sent to another transmitting terminal. The other transmitting terminal receives the image data and the voice sound data, and displays images on a display, etc., and outputs voice sound from a speaker. Accordingly, a TV conference can be held between these transmitting terminals.

As described above, to a transmitting terminal participating in a conference, image data is delivered from another transmitting terminal at another location that is participating in the conference. When there are a plurality of other transmitting terminals, a plurality of image data items are delivered. In this case, the receiving transmitting terminal is entrusted to determine how to lay out and display the image data items received from the other transmitting terminals on a display, etc.

Thus, there is devised a technique of determining the layout when displaying image data items received from a plurality of transmitting terminals, according to the status of the transmitting terminal (see, for example, Patent Document 1). Patent Document 1 discloses a system for video communication in which the layout is changed when the system condition of the transmitting terminal changes.

Patent Document 1: Japanese Unexamined Patent Application Publication No. 2013-531934

SUMMARY OF THE INVENTION

An aspect of the present invention provides an information processing apparatus, an image display method, and a communication system in which one or more of the above-described disadvantages are reduced.

According to one aspect of the present invention, there is provided an information processing apparatus including a receiver configured to receive one or more images from one or more other information processing apparatuses communicating with the information processing apparatus via a network; a band information acquirer configured to acquire reception band information of the receiver; a first display number determiner configured to determine a first number of the one or more images to be displayed on a display device according to the reception band information; a second display number determiner configured to determine the first number of the one or more images, which has been determined by the first display number determiner, as a second number of the one or more images to be displayed on the display device, when the reception band information is stable, and determine a present number of the one or more images, which is presently displayed on the display device, as the second number of the one or more images to be displayed on the display device, when the reception band information is unstable; and a display processor configured to display the second number of the one or more images, which has been determined by the second display number determiner, on the display device.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the related art described in Patent Document 1, when the layout of the screen is changed in accordance with changes in the system condition, the layout is frequently changed, and therefore the user may feel a sense of discomfort. That is, the layout determined by the transmitting terminal is directly used as the layout of the screen that is viewed by the user, and therefore the user views the changes in the layout in a real-time manner. For example, when the network status of the receiving transmitting terminal improves, and the transmitting terminal determines to increase the number of image data items to be displayed (hereinafter referred to as "display location number"), the user will view a screen in which the number of image data items has increased. However, when the network status deteriorates immediately after increasing the display location number, the transmitting terminal determines to decrease the display location number, and therefore the user will view a screen in which the number of image data items has decreased.

As described above, in an environment in which the network status is not always stable, the display location number changes within a short time and the layout of the screen may frequently change. Accordingly, unfavorable screen transitions from the user's viewpoint may occur.

A problem to be solved by an embodiment of the present invention is to provide an information processing apparatus in which frequent screen transitions are reduced.

Embodiments of the present invention will be described by referring to the accompanying drawings.

Figure 1:
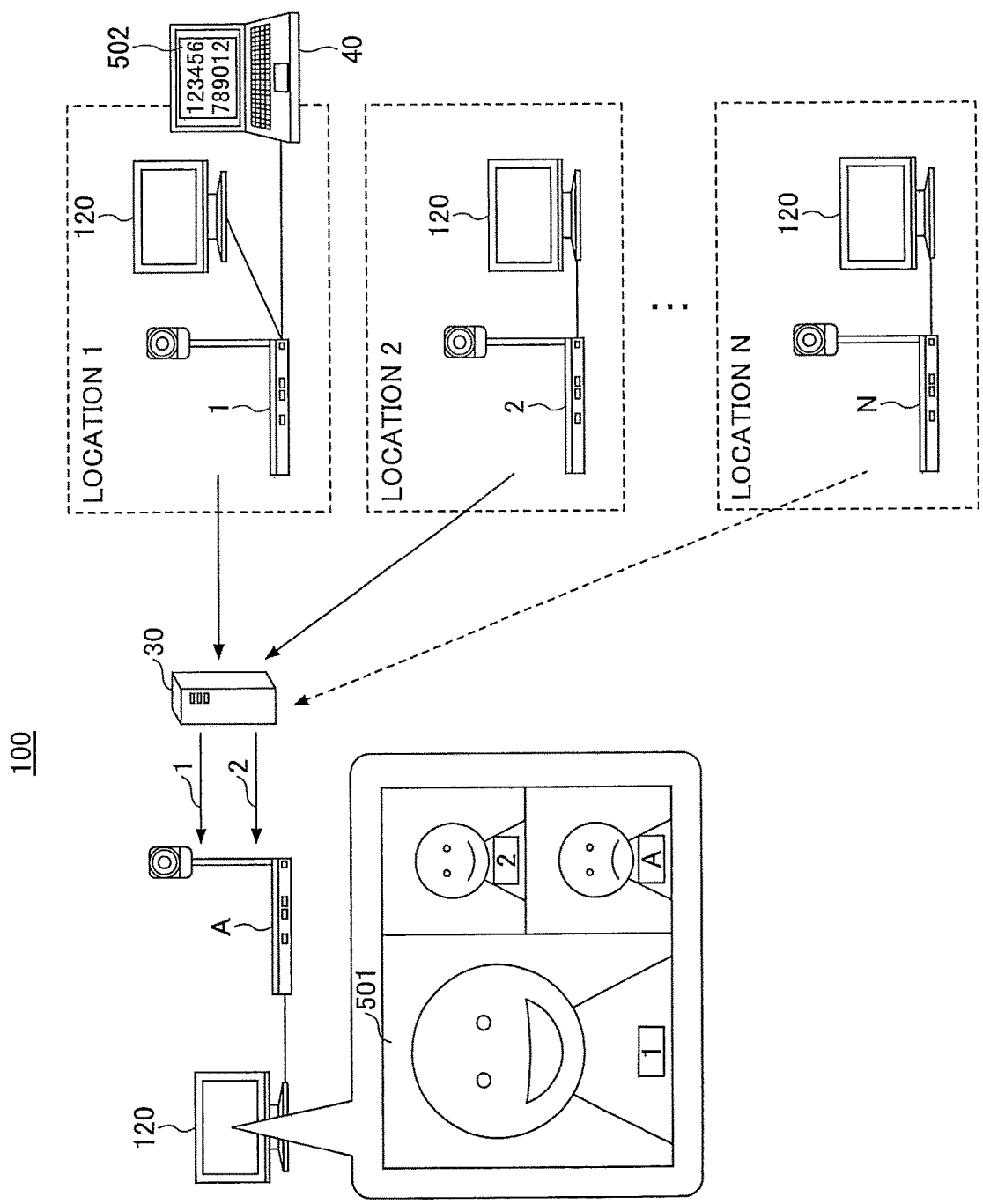
FIG. 1 is a schematic diagram illustrating transmission and reception of images and voice sound by a transmission system according to an embodiment of the present invention.

FIG. 1 is a schematic diagram illustrating the transmission and reception of images and voice sound by a transmission system 100 according to an embodiment of the present invention. A transmitting terminal A is having a TV conference with transmitting terminals 1 through N at locations 1 through N. The location is the place where the transmitting terminal is located; however, there may be a plurality of transmitting terminals located at the same location (for example, in a conference room). In the present embodiment, as a matter of convenience, it is assumed that the number of locations and the number of transmitting terminals are the same.

Displays 120 are connected to the transmitting terminals A and 1 through N; however, in the following, a description is given of a conference screen 501 displayed on the display 120 of the transmitting terminal A. Furthermore, there may be a case where an information display device 40 is connected to any one of the transmitting terminals A and 1 through N. In FIG. 1, as a matter of convenience, the information display device 40 is connected to the transmitting terminal 1. The data displayed by the information display device 40 is referred to as display data 502.

The transmitting terminals A and 1 through N are connected to a relay device 30 in a network. The relay device 30 relays at least one kind of data among an image, voice sound, and display data (hereinafter, at least one of an image, voice sound, and display data is referred to as "content data"). Therefore, when the number of locations is 1+N as illustrated in FIG. 1, the relay device 30 sends a maximum of N content data items to the transmitting terminal A.

Next, the transmitting terminal A is simultaneously displaying two (<N) images (images of transmitting terminals 1 and 2; however, the images may be of any of the transmitting terminals 1 through N; furthermore, the image of the transmitting terminal A that is the own device is not counted) on the display 120. This number "2" is hereinafter referred to as a "display location number" (the number of locations that are displayed or to be displayed is referred to as a "display location number"). The transmitting terminal A is able to determine the number of images that can be displayed at the same time on the display 120, according to the reception band. In this case, the relay device 30 detects the transmitting terminals 1 and 2, which are the transmission sources of the images displayed by the transmitting terminal A, and the relay device 30 sends only the content data items 1 and 2 of the transmitting terminals 1 and 2 to the transmitting terminal A. The number of locations, from which content data items are received, is hereinafter referred to as a "reception location number".

Therefore, display location number=reception location number is satisfied. The transmitting terminal A receives only the images to be displayed on the display 120, and therefore wasteful usage of the band can be reduced.

Figure 2:
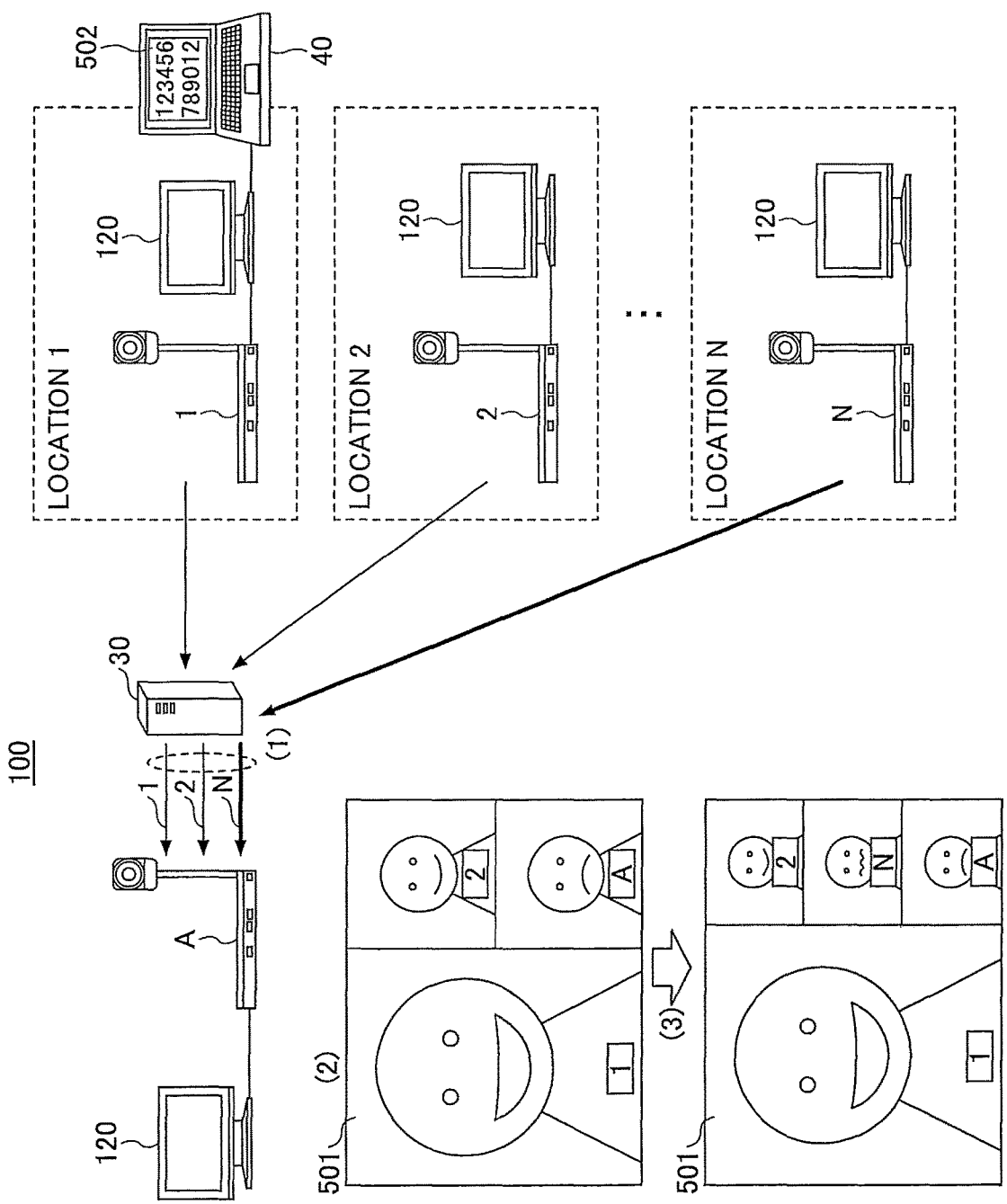
FIG. 2 is a schematic diagram illustrating features of the transmission system according to an embodiment of the present invention.

FIG. 2 is a schematic diagram illustrating features of the transmission system 100 according to an embodiment of the present invention. The state illustrated in FIG. 2 is assumed to be a state in which the reception band of the transmitting terminal has improved from the state illustrated in FIG. 1. The transmitting terminal A determines to increase the display location number to "3", according to the improvement of the reception band (reception band information). Here, it is determined that content data is to be received from the transmitting terminal N (the transmitting terminal is determined according to the priority rank order described below). In this case, the transmitting terminal A according to the present embodiment operates as described below.

(1) The transmitting terminal A starts to receive content data of the transmitting terminals 1, 2, and N from the relay device 30.

(2) The transmitting terminal A determines whether the reception band is stable, without displaying the image of the transmitting terminal N. Therefore, the state becomes "display location number+1=reception location number".

(3) When the reception band is confirmed to be stable even after starting to receive content data of the transmitting terminal N, the transmitting terminal A increases the display location number to "3".

On the other hand, when the reception band is confirmed to be unstable after the transmitting terminal A starts to receive content data of the transmitting terminal N, the transmitting terminal A maintains the display location number as "2" and stops receiving the content data from the transmitting terminal N.

As described above, in the image display method according to the present embodiment, it is confirmed whether the network status is good and stable before increasing the display location number. Thus, it is possible to reduce cases where the display location number is increased and then decreased again due to an unstable reception band. Accordingly, frequent changes in the layout are reduced, and therefore the sense of discomfort felt by the user can be reduced.

<System Configuration>

Figure 3:
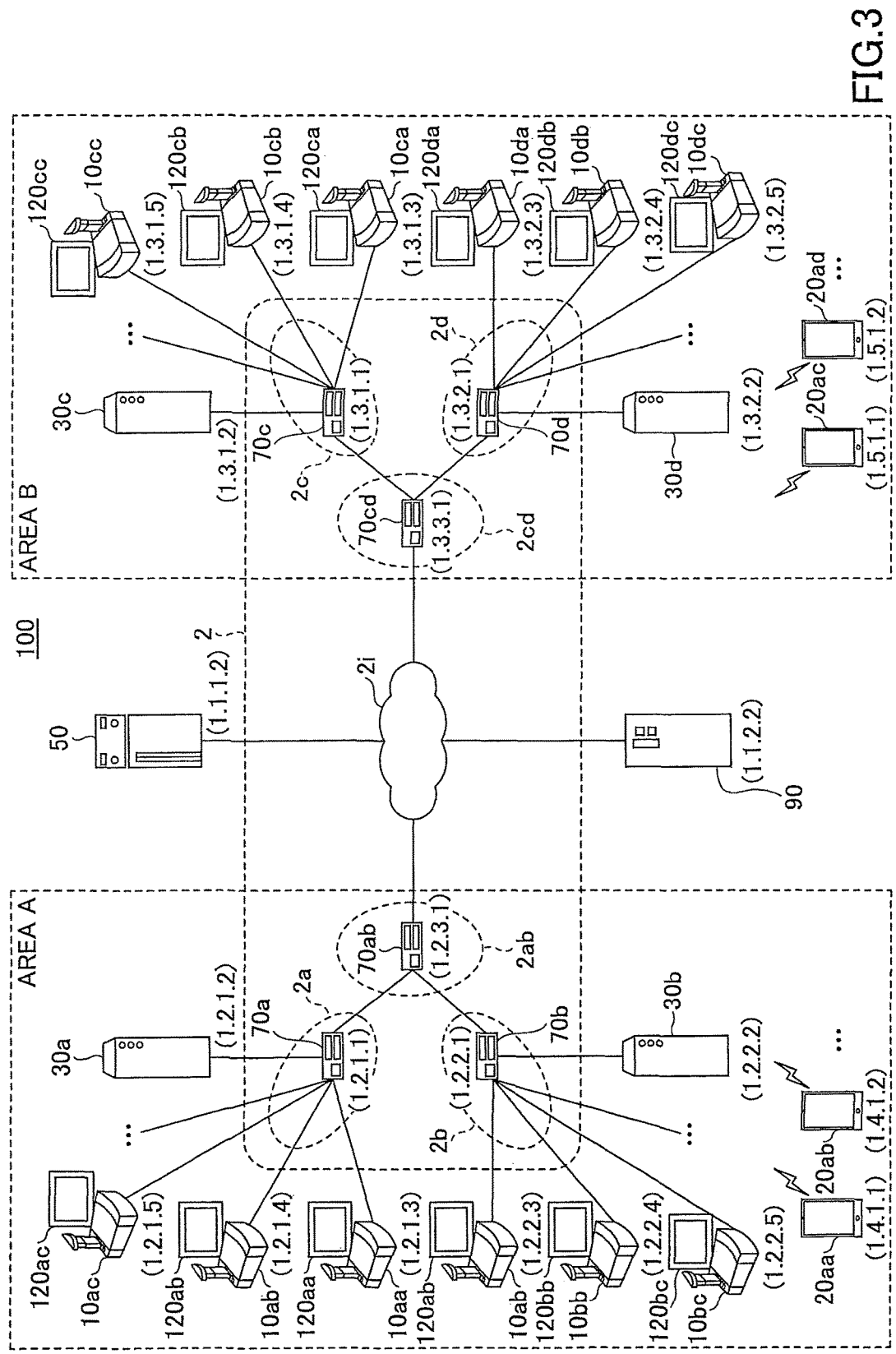
FIG. 3 is a schematic diagram illustrating an example of the transmission system according to an embodiment of the present invention.

FIG. 3 is a schematic diagram illustrating an example of the transmission system 100 according to an embodiment of the present invention. The transmission system 100 (example of a communication system) is a communication system for a plurality of transmitting terminals to communicate information and emotions to each other via a transmission management system 50. Examples of the transmission system 100 are a TV conference system, a videophone system, a voice sound conference system, a voice sound phone system, a Personal Computer (PC) screen sharing system, and a text chat system, etc. Furthermore, the transmission system 100 includes a data providing system for sending content data in one direction from one transmitting terminal to another transmitting terminal via the transmission management system 50.

In the present embodiment, a description is given of the transmission system 100 by which TV conferences can be held, as an example of a communication system.

The transmission system 100 illustrated in FIG. 3 includes a plurality of transmitting terminals (10*aa*, 10*ab*, and so on), a plurality of mobile terminals (20*aa*, 20*ab*, and so on), the displays (120*aa*, 120*ab*, and so on) for the transmitting terminals (10*aa*, 10*ab*, and so on), a plurality of relay devices (30*a*, 30*b*, and so on), the transmission management system 50, and a program providing system 90.

The plurality of transmitting terminals 10 send and receive image data and voice sound data that are examples of content data. The information display device 40 is omitted in FIG. 3. The plurality of transmitting terminals 10 are TV conference terminals that can use a TV conference service. In the present embodiment, the transmitting terminals 10 are assumed to be terminals that are exclusively used for TV conferences.

On the other hand, the plurality of mobile terminals 20 send and receive image data and voice sound data that are examples of content data. The mobile terminals 20 may be able to send and receive text data. That is, the plurality of mobile terminals 20 may be able to use text chat, in addition to TV conferences. In the present embodiment, unless otherwise mentioned, the mobile terminal 20 may be a tablet terminal, a mobile phone, a smartphone, a Personal Digital Assistant (PDA), a wearable PC, a game console, a general-purpose PC terminal, a car navigation terminal, an electronic whiteboard, a projector, a monitor camera, and an industrial device including a communication function, etc. Furthermore, the industrial device includes an office device such as a Multifunction Peripheral/Printer/Product (MFP), a medical device such as an endoscopic instrument, and an agricultural device such as a tilling machine. The wearable PC includes a watch and a head mount display, etc. Note that the mobile terminal 20 is wirelessly connected to a communication network 2, for example, via a mobile phone communication network or Wireless Fidelity (WiFi).

As it will be clear from the hardware configurations described below, the transmitting terminal 10 and the mobile terminal 20 are referred to as an information processing apparatus.

The transmitting terminal 10 and the mobile terminal 20 are managed by the transmission management system 50 for managing the call control of the transmission system 100.

Note that in the following, any one of the plurality of transmitting terminals (10*aa*, 10*ab*, and so on) is referred to as the "transmitting terminal 10" and any one of the mobile terminals (20*aa*, 20*ab*, and so on) is referred to as the "mobile terminal 20". The same applies to the display 120, the relay device 30, and a router 70.

Furthermore, one transmitting terminal 10 or mobile terminal 20 that sends a request to start a TV conference to another transmitting terminal 10 or mobile terminal 20 is referred to as a "request source terminal", and the terminal that is the destination to which the request is sent is referred to as a "destination terminal".

Furthermore, in the transmission system 100, between the request source terminal and the destination terminal, a management information session is established via the transmission management system 50. The management information session is for sending and receiving various kinds of management information. Furthermore, between the request source terminal and the destination terminal, a session for sending and receiving content data is established via the relay device 30. Note that the session for content data does not always have to be mediated by the relay device 30. The session for content data may be communicated via the transmission management system 50, or the session for content data may be directly communicated between the request source terminal and the destination terminal.

As described above, the relay device 30 relays the content data between the plurality of transmitting terminals 10 and the plurality of mobile terminals 20.

The transmission management system 50 implements call control between the transmitting terminals 10 or the mobile terminals 20. The transmission management system 50 also performs login authentication of the transmitting terminal 10 and the mobile terminal 20, manages a call status, manages a destination list, reports a transmission destination of content data to the relay device 30, and causes the relay device 30 to manage the call status.

The transmission management system 50 is an information processing apparatus; however, the transmission management system 50 may also be a monitor camera, an industrial device including a communication function, or a wearable PC, etc. Furthermore, the industrial device includes an office device such as a MFP, a medical device such as an endoscopic instrument, and an agricultural device such as a tilling machine. The wearable PC includes a watch and a head mount display, etc.

The program providing system 90 stores terminal-use programs in a Hard Disk (HD) 304 described below. The terminal-use programs are for causing the transmitting terminal 10 and the mobile terminal 20 to realize various functions. The program providing system 90 can send the terminal-use programs to the transmitting terminal 10 and the mobile terminal 20. The program providing system 90 also stores management-device-use programs in the HD 304 described below. The management-device-use programs are for causing the transmission management system 50 to realize various functions. The program providing system 90 can send the management-device-use programs to the transmission management system 50.

The transmitting terminals (10*aa*, 10*ab*, 10*ac*, and so on), the relay device 30*a*, and the router 70*a* are communicatively connected by a LAN 2*a*. The transmitting terminals (10*ad*, 10*bb*, 10*bc*, and so on), the mobile terminals (20*aa*, 20*ab*, and so on), the relay device 30*b*, and the router 70*b* are communicatively connected by a LAN 2*b*. Furthermore, the LAN 2*a* and the LAN 2*b* are communicatively connected by an exclusive-use line 2*ab* including the router 70*ab*, and the LAN 2*a* and the LAN 2*b* are constructed in a predetermined area A. For example, the area A is Japan, the LAN 2*a* is constructed in a business office in Tokyo, and the LAN 2*b* is constructed in a business office in Osaka. Furthermore, the mobile terminals (20aa, 20ab, and so on) are used in the area A.

On the other hand, the transmitting terminals (10ca, 10cb, 10cc, and so on), the relay device 30c, and the router 70c are communicatively connected by a LAN 2c. The transmitting terminals (10da, 10db, 10dc, and so on), the mobile terminals (20ac, 20ad, and so on), the relay device 30d, and the router 70d are communicatively connected by a LAN 2d. Furthermore, the LAN 2c and the LAN 2d are communicatively connected by an exclusive-use line 2cd including the router 70cd, and the LAN 2c and the LAN 2d are constructed in a predetermined area B. For example, the area B is the USA, the LAN 2c is constructed in a business office in New York, and the LAN 2d is constructed in a business office in Washington D.C. Furthermore, the mobile terminals (20ac, 20ad, and so on) are used in the area B.

Furthermore, the transmission management system 50 and the program providing system 90 are communicatively connected with the transmitting terminals 10, the mobile terminals 20, and the relay devices 30 via the Internet 2i. The transmission management system 50 or the program providing system 90 may be disposed in the area A or the area B or in another area.

Furthermore, in FIG. 3, the group of four numbers indicated below each of the transmitting terminals 10, the mobile terminals 20, the relay devices 30, the transmission management system 50, the routers 70, and the program providing system 90, indicate an IP address in a general IPv4 in a simplified manner.

<Session of Transmission System>

Figure 4:
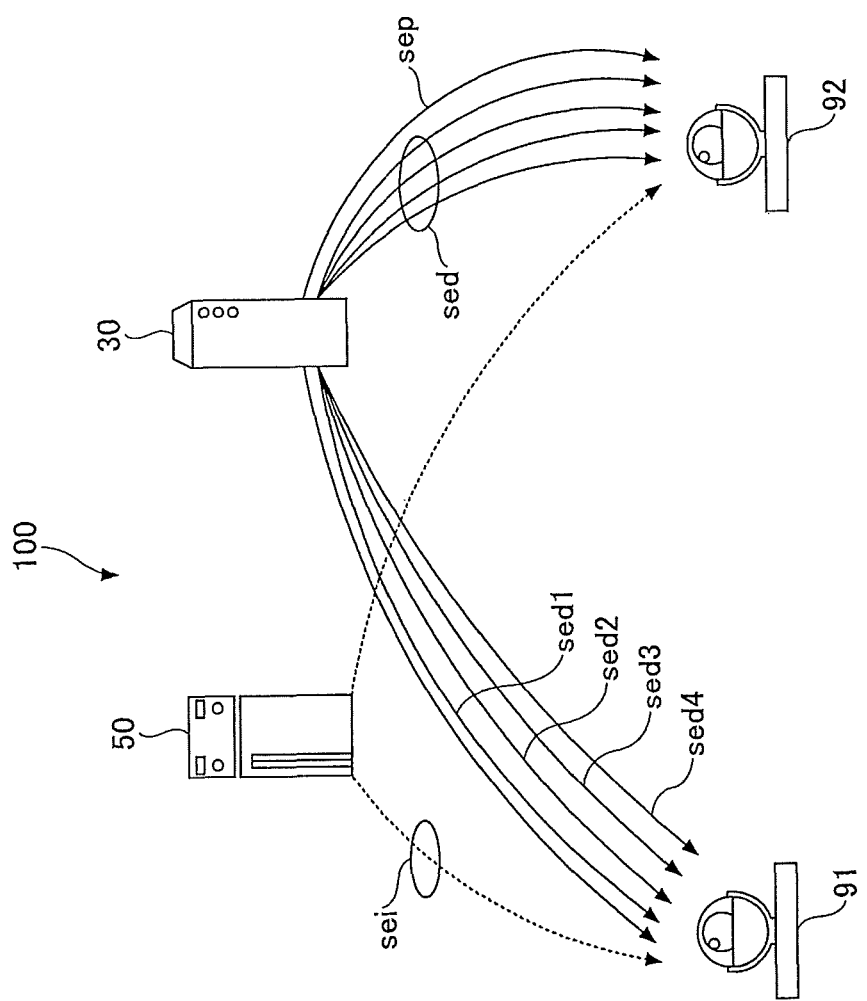
FIG. 4 is a diagram illustrating examples of sessions that are controlled by the transmission system according to an embodiment of the present invention.

FIG. 4 is a diagram illustrating examples of sessions that are controlled by the transmission system 100. As illustrated in FIG. 4, a session for management information sei is established between a request source terminal 91 and a destination terminal 92 in the transmission system 100. The session for management information sei is for sending and receiving various kinds of management information via the transmission management system 50. Furthermore, four sessions are established between the request source terminal 91 and the destination terminal 92, for sending and receiving four kinds of data via the relay device 30. The four kinds of data are high-resolution image data sed1, mid-resolution image data sed2, low-resolution image data sed3, and voice sound data sed4. These four sessions are collectively indicated as a session sed for image/voice sound data. Furthermore, as illustrated in FIG. 4, a session sep for display data is established. Alternatively, any of the sessions sed for images and voice sound data may be used as a session for sending and receiving display data.

<Hardware Configuration>
<<Transmitting Terminal>>

Figure 5:
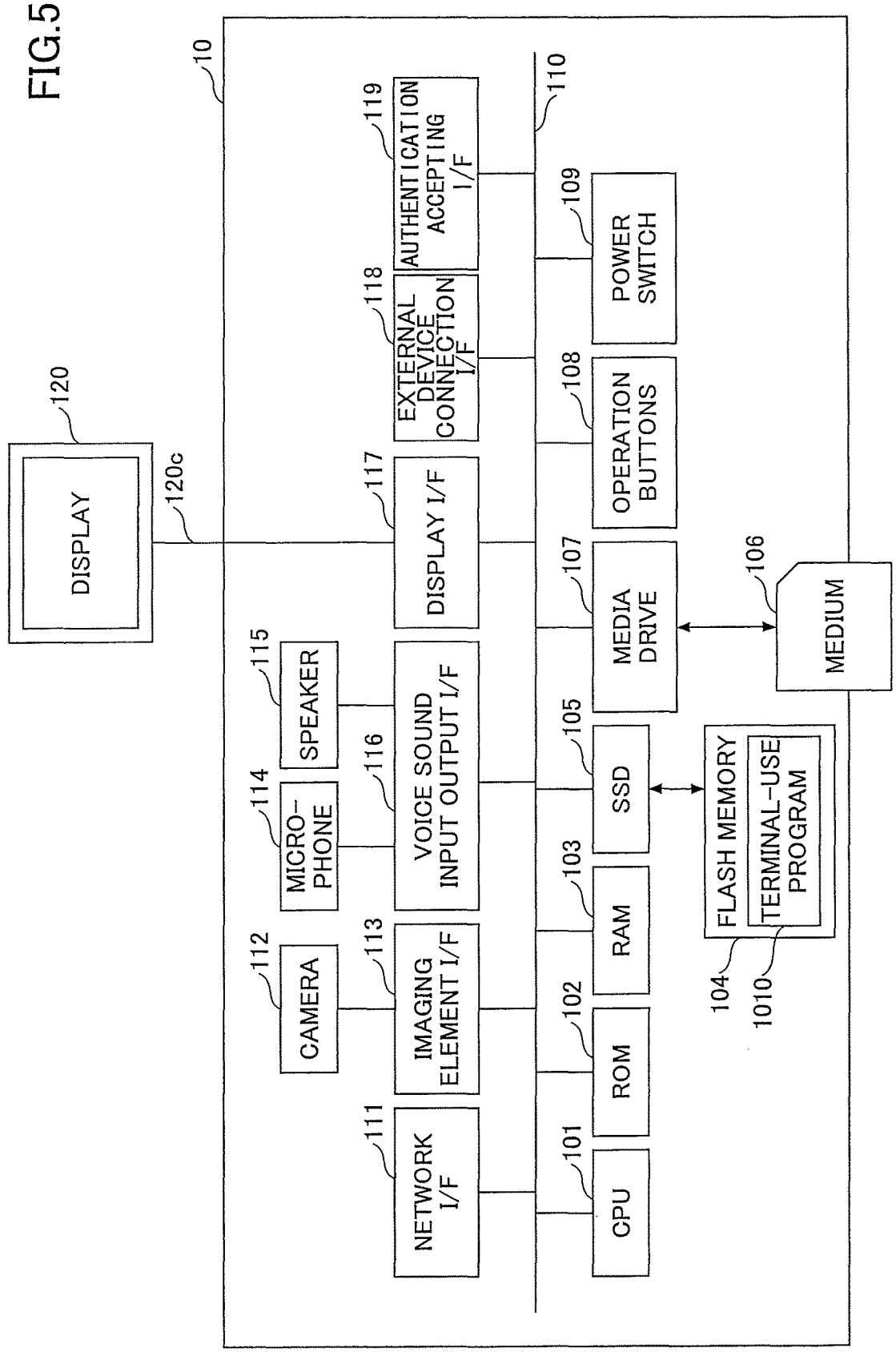
FIG. 5 is a block diagram illustrating a hardware configuration of a transmitting terminal according to an embodiment of the present invention.

Next, referring to FIG. 5, a description is given of a hardware configuration of the transmitting terminal 10. FIG. 5 is a block diagram illustrating a hardware configuration of the transmitting terminal 10 according to an embodiment of the present invention. As illustrated in FIG. 5, the transmitting terminal 10 according to the present embodiment includes a Central Processing Unit (CPU) 101 for controlling operations of the entire transmitting terminal 10. Furthermore, the transmitting terminal 10 includes a Read-Only Memory (ROM) 102 storing programs used for driving the CPU 101 such as an Initial Program Loader (IPL), etc., and a Random Access Memory (RAM) 103 used as a work area of the CPU 101. Furthermore, the transmitting terminal 10 includes a flash memory 104 storing various kinds of data such as a terminal-use program 1010, image data, and voice sound data, etc. Furthermore, the transmitting terminal 10 includes a Solid State Drive (SSD) 105 for controlling the reading or the writing of various kinds of data with respect to the flash memory 104, under the control of the CPU 101. Furthermore, the transmitting terminal 10 includes a media drive 107 for controlling the reading or the writing (storing) of data with respect to a recording medium 106 such as a flash memory, etc., and operation buttons 108 that are operated when selecting a destination at the transmitting terminal 10. Furthermore, the transmitting terminal 10 includes a power switch 109 for switching ON/OFF the power source of the transmitting terminal 10, and a network interface (I/F) 111 for performing data transmission by using the communication network 2.

Furthermore, the transmitting terminal 10 includes a built-in camera 112 for capturing an image of a subject and obtaining image data under the control of the CPU 101, an imaging element I/F 113 for controlling the driving of the camera 112, and a built-in microphone 114 for inputting voice sound. Furthermore, the transmitting terminal 10 includes a built-in speaker 115 for outputting voice sound, and a voice sound input output I/F 116 for processing the input and output of voice sound signals between the microphone 114 and the speaker 115 under the control of the CPU 101. Furthermore, the transmitting terminal 10 includes a display I/F 117 for transmitting image data to an external display 120 under the control of the CPU 101 and an external device connection I/F 118 for connecting various external devices. Furthermore, the transmitting terminal 10 includes an authentication accepting I/F 119 and a bus line 110 such as an address bus and a data bus, etc., for electrically connecting the above elements as illustrated in FIG. 5.

The display 120 is a display device including a liquid crystal display or an organic electro-luminescence (EL) display for displaying an image of a subject and icons used for operation, etc. Furthermore, the display 120 is connected to the display I/F 117 via a cable 120c. The display 120 of the transmitting terminal 10 is connected to the display I/F 117 by the cable 120c; however, the display 120 is not so limited. The display 120 may be built in the transmitting terminal 10.

To the external device connection I/F 118, external devices such as an external camera, an external microphone, and an external speaker, etc., can be connected by a Universal Serial Bus (USB) cable, etc.

The authentication accepting I/F 119 is an interface for accepting input of authentication information from a user. Specifically, the authentication accepting I/F 119 may be a reading device such as an integrated circuit (IC) card reader (for example, a Near Field Communication (NFC) card reader), a Secure Digital (SD) card reader, and a Subscriber Identity Module (SIM) card reader, etc.

Furthermore, the terminal-use program 1010 may be recorded in and distributed by a computer-readable recording medium such as the recording medium 106 in a file having an installable format or an executable format. Furthermore, the terminal-use program 1010 may be stored in the ROM 102 instead of the flash memory 104.

The hardware configuration of the mobile terminal 20 and the hardware configuration of the transmitting terminal 10 have overlapping parts, and even if there were any differences, it is assumed that there will be no problem in constructing the transmission system 100.

<<Transmission Management System, Relay Device, and Program Providing System>>

Figure 6:
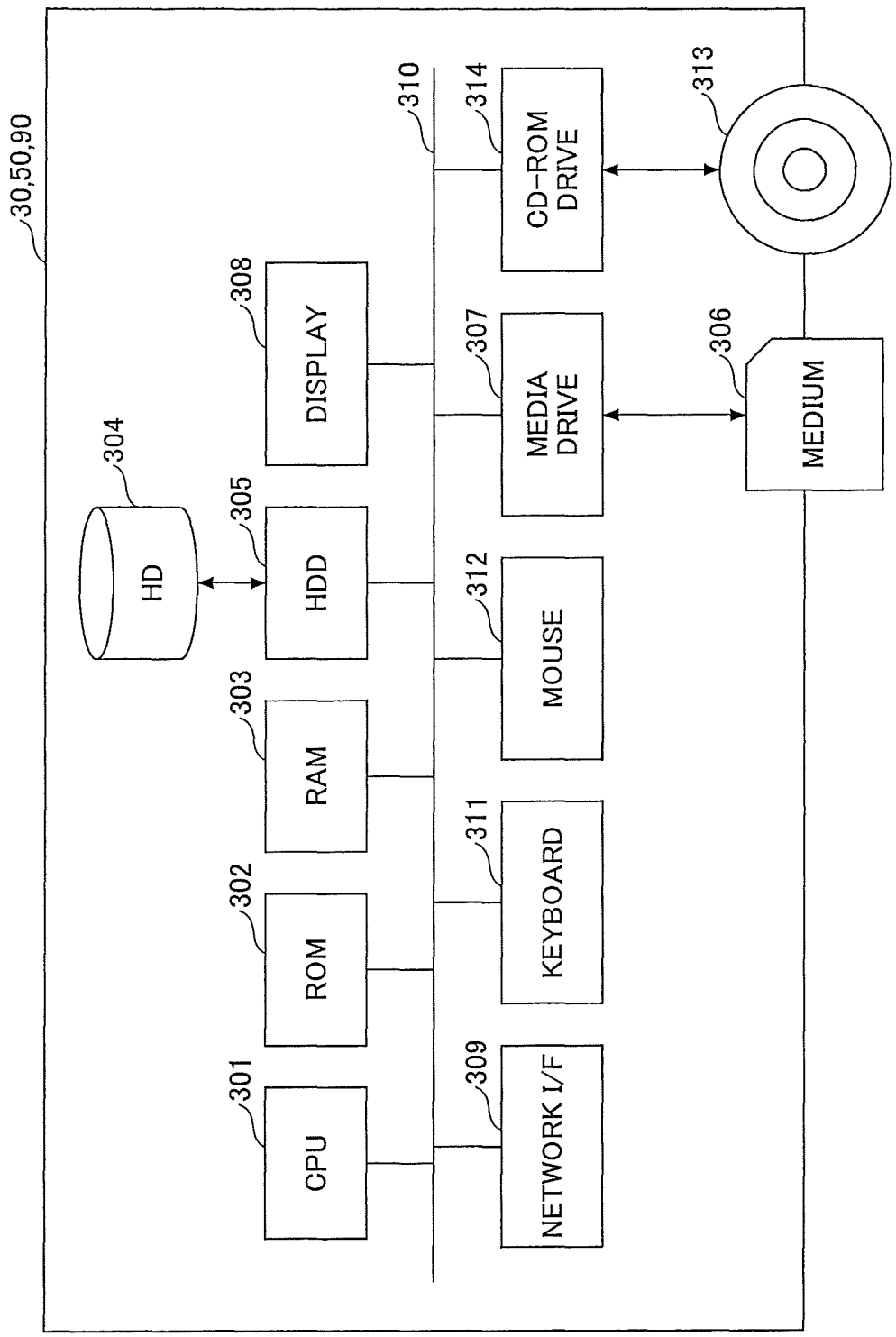
FIG. 6 is a block diagram illustrating a hardware configuration of a transmission management system according to an embodiment of the present invention.

Next, referring to FIG. 6, a description is given of a hardware configuration of the transmission management system 50. FIG. 6 is a block diagram illustrating a hardware configuration of the transmission management system 50 according to an embodiment of the present invention.

Note that the illustrated hardware configuration of the transmission management system 50, etc., does not need to be stored in a single housing or does not need to be provided as a single device. The illustrated hardware configuration indicates hardware elements that are preferably included in the transmission management system 50, etc. Furthermore, in order to accommodate cloud computing, the physical configuration of the transmission management system 50, etc., according to the present embodiment does not have to be fixed. The hardware resources may be dynamically connected or cut off according to the load.

The transmission management system 50 includes a CPU 301 for controlling the operations of the entire transmission management system 50, a ROM 302 storing programs used for driving the CPU 301 such as an IPL, and a RAM 303 used as a work area of the CPU 301. Furthermore, the transmission management system 50 includes the HD 304 for storing various kinds of data such as management device-use programs, etc., and a Hard Disk Drive (HDD) 305 for controlling the reading or the writing of various kinds of data with respect to the HD 304 under the control of the CPU 301. Furthermore, the transmission management system 50 includes a media drive 307 for controlling the reading or the writing (storing) of data with respect to a recording medium 306 such as a flash memory, etc., and a display 308 for displaying various kinds of information such as a cursor, a menu, a window, characters, or images. Furthermore, the transmission management system 50 includes a network I/F 309 for performing data transmission by using the communication network 2, a keyboard 311 including a plurality of keys for inputting characters, values, and various instructions, and a mouse 312 for selecting and executing various instructions, selecting a processing target, and moving the cursor. Furthermore, the transmission management system 50 includes a Compact Disc Read-Only Memory (CD-ROM) drive 314 for controlling the reading or the writing of various kinds of data with respect to a CD-ROM 313 that is an example of a removable recording medium. Furthermore, the transmission management system 50 includes a bus line 310 such as an address bus and a data bus, etc., for electrically connecting the above elements as illustrated in FIG. 6.

Furthermore, the management device-use program may be recorded in and distributed by a computer-readable recording medium such as the recording medium 306 or the CD-ROM 313 in a file having an installable format or an executable format. Furthermore, the management device-use program may be stored in the ROM 302 instead of the HD 304.

Furthermore, the hardware configuration of the relay device 30 and the program providing system 90 is the same as the hardware configuration of the transmission management system 50 described above, and is thus not described.

<Functional Configuration of Transmission System>

Figure 7:
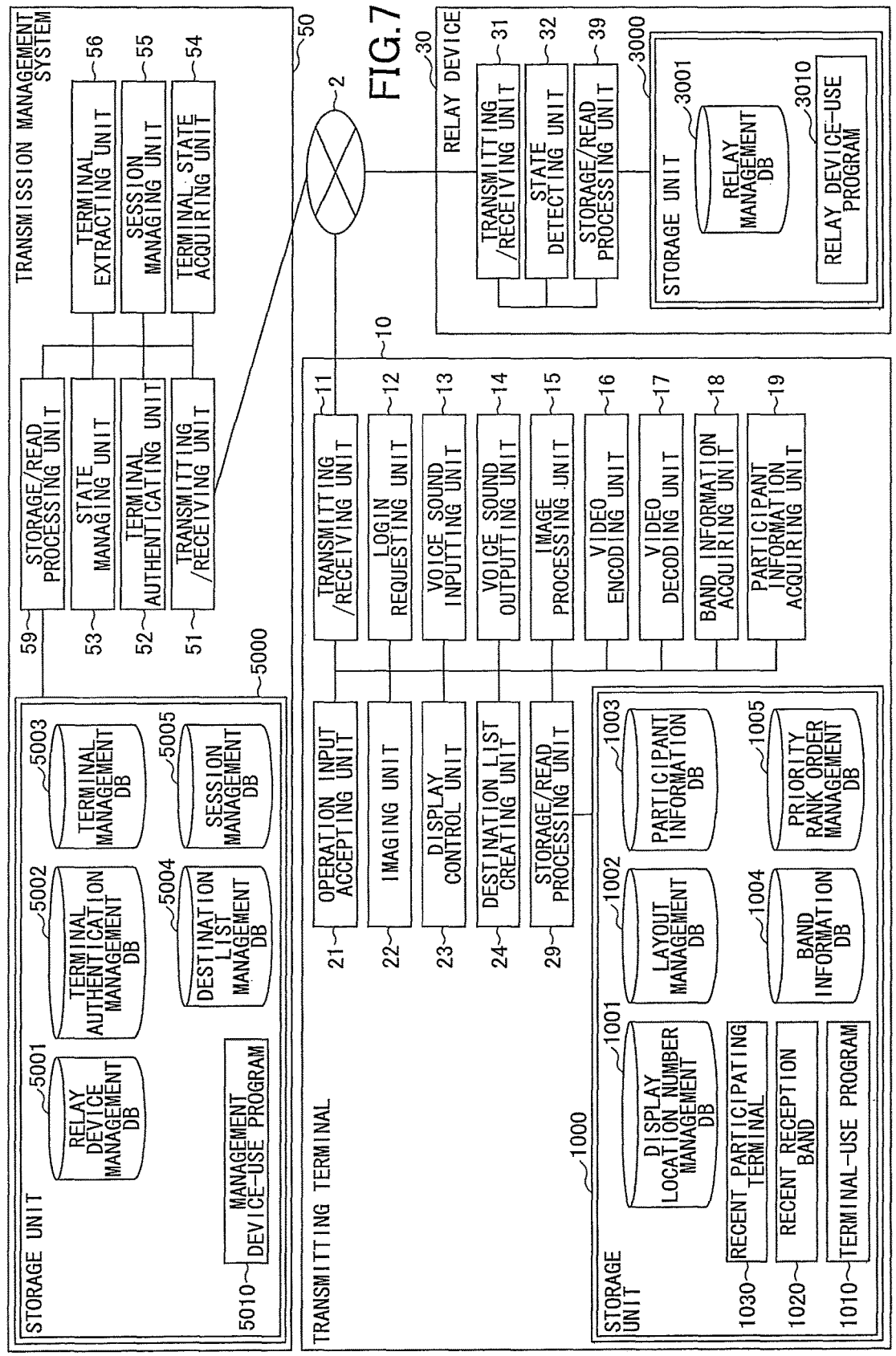
FIG. 7 is a functional block diagram of the transmission management system, the transmitting terminal, and the relay device included in the transmission system according to an embodiment of the present invention.

Next, referring to FIG. 7, a description is given of a functional configuration of the transmission system 100 according to the present embodiment. FIG. 7 is a functional block diagram of the transmission management system 50, the transmitting terminal 10, and the relay device 30 included in the transmission system 100 according to an embodiment of the present invention. In FIG. 7, the transmitting terminal 10, the relay device 30, and the transmission management system 50 are data-communicatively connected via the communication network 2. Furthermore, the program providing system 90 illustrated in FIG. 3 is omitted in FIG. 7 since the program providing system 90 is not directly related to the communication in a TV conference.

<<Functional Configuration of Transmitting Terminal>>

The transmitting terminal 10 includes a transmitting/receiving unit 11, a login requesting unit 12, a voice sound inputting unit 13, a voice sound outputting unit 14, an image processing unit 15, a video encoding unit 16, a video decoding unit 17, a band information acquiring unit 18, a participant information acquiring unit 19, an operation input accepting unit 21, an imaging unit 22, a display control unit 23, a destination list creating unit 24, and a storage/read processing unit 29. These units are functions that are realized or means that are provided as any of the elements illustrated in FIG. 5 operates in response to an instruction from the CPU 101 according to the terminal-use program 1010 loaded in the RAM 103 from the flash memory 104.

Furthermore, the transmitting terminal 10 includes a storage unit 1000 that is constructed by the RAM 103, the ROM 102, and the flash memory 104 illustrated in FIG. 5. The storage unit 1000 stores a display location number management Data Base (DB) 1001, a layout management DB 1002, a participant information DB 1003, a band information DB 1004, a priority rank order management DB 1005, a recent participating terminal 1030, a recent reception band 1020, and the terminal-use program 1010.

The recent participating terminal 1030 is information that is referred to when updating the display location number. The recent participating terminal 1030 indicates the number of participating terminals immediately before updating the display location number (participating terminals are described below). The recent reception band 1020 is information referred to when updating the display location number. The recent reception band 1020 is the reception band immediately before updating the display location number.

In the following, a description is given of the databases.

TABLE 1

DISPLAY LOCATION NUMBER MANAGEMENT TABLE

| RECEPTION BAND | DISPLAY LOCATION NUMBER |
|---|---|
| 0 kbps~200 kbps | 1 LOCATION |
| 200 kbps~400 kbps | 2 LOCATIONS |
| ... | ... |

The display location number management DB 1001 including a display location number management table is constructed in the storage unit 1000. In the display location number management table, the display location number is managed in association with a reception band. As the reception band increases, the display location number (the number of locations that can be displayed at the same time) increases. For example, in a reception band of "0 kilobits per second (kbps) through 200 kbps", the display location number is 1. In a reception band of "200 kbps through 400 kbps", the display location number is 2.

TABLE 2

LAYOUT MANAGEMENT TABLE

| DISPLAY LOCATION NUMBER | DISPLAY LOCATION | HORIZONTAL DIRECTION STARTING POINT | HORIZONTAL DIRECTION ENDING POINT | VERTICAL DIRECTION STARTING POINT | VERTICAL DIRECTION ENDING POINT |
|---|---|---|---|---|---|
| 1 LOCATION | FIRST LOCATION | 0% | 100% | 0% | 100% |
| 2 LOCATIONS | FIRST LOCATION | 0% | 50% | 0% | 100% |
|  | SECOND LOCATION | 50% | 100% | 0% | 100% |
| ... | ... | ... | ... | ... | ... |

Figure 9:
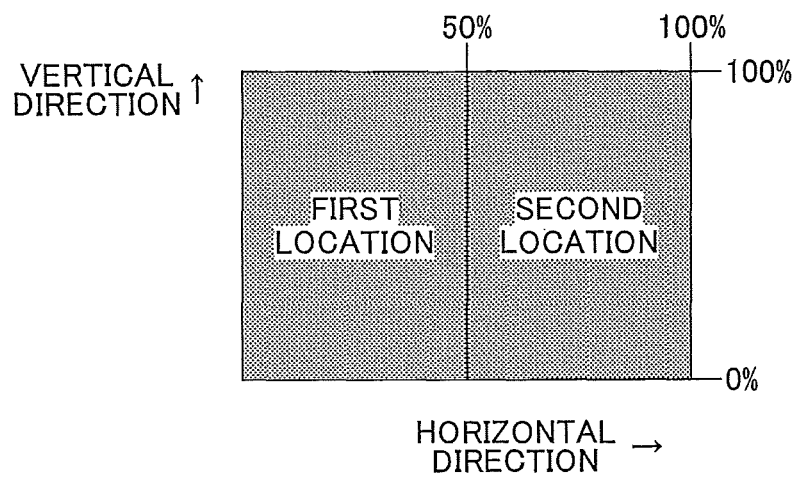
FIG. 9 is a diagram illustrating an example of a layout in a case where the display location number is two locations.

The layout management DB 1002 including a layout management table is constructed in the storage unit 1000. In the layout management table, a display location, a horizontal direction starting point, a horizontal direction ending point, a vertical direction starting point, and a vertical direction ending point are managed in association with a display location number. For example, when the display location number is 1, the image data of the corresponding location is displayed from a starting point of 0% in the horizontal direction and the vertical direction of the display 120 to an ending point of 100% in the horizontal direction and the vertical direction of the display 120. That is, the entire display is occupied by a single image data item. Note that FIG. 9 is a diagram illustrating an example of a layout, in which the layout management table is applied, when there are two locations.

TABLE 3

PARTICIPANT INFORMATION TABLE

| PARTICIPATING TERMINAL | IMAGE RECEPTION | VOICE SOUND RECEPTION | DISPLAY DATA RECEPTION |
|---|---|---|---|
| TRANSMITTING TERMINAL 01ab | Bp: RECEIVED | Bv: RECEIVED | Bd: NOT RECEIVED |
| TRANSMITTING TERMINAL 01ac | Cp: RECEIVED | Cv: RECEIVED | Cd: NOT RECEIVED |
| TRANSMITTING TERMINAL 01ad | Dp: NOT RECEIVED | Dv: NOT RECEIVED | Dd: NOT RECEIVED |

The participant information DB 1003 including a participant information table is constructed in the storage unit 1000. In the participant information table, identification information of image reception, voice sound reception, display data reception; and indications of whether these data items are received, are associated with each participating terminal. The participating terminal is a transmitting terminal that has established a session. The participating terminal is in a state where at least one of reception and transmission of content data is possible; however, the participating terminal may not necessarily be performing reception or transmission.

In an example of the transmitting terminal 10ab (communication ID is 01ab), Bp is the image data ID of the transmitting terminal 10ab, Bv is the voice sound data ID of the transmitting terminal 10ab, and Bd is the display data ID of the transmitting terminal 10ab. That is, Bp is identification information used by another transmitting terminal 10 and the relay device 30 for uniquely identifying the image data sent by the transmitting terminal 10ab. Bv is identification information used by another transmitting terminal 10 and the relay device 30 for uniquely identifying the voice sound data sent by the transmitting terminal 10ab. Bd is identification information used by another transmitting terminal 10 and the relay device 30 for uniquely identifying the display data sent by the transmitting terminal 10ab. In the following, when identification information of image reception, identification information of voice sound reception, and identification information of display data reception are not particularly distinguished, the identification information is referred to as "data ID". The method of creating a participant information table will be described by referring to FIG. 12.

Note that an ID used in the present embodiment indicates identification information such as a language, a character, a symbol, or various marks, etc., used for uniquely identifying the target to be identified. Furthermore, a communication ID and a relay device ID may be identification information including a combination of at least two of a language, a character, a symbol, and various marks.

TABLE 4

BAND INFORMATION TABLE

|  | IMAGE | VOICE SOUND | DISPLAY DATA | TOTAL |
|---|---|---|---|---|
| TRANSMISSION BAND [kbps] | 1,200 | 72 | 0 | 1,272 |
| RECEPTION BAND [kbps] | 200 | 72 | 0 | 272 |

The band information DB 1004 including a band information table is constructed in the storage unit 1000. In the band information table, the bands of images, voice sound, display data, and total are registered with respect to transmission and reception. For example, as the reception band for images, 200 kbps is secured, and the images of the present number of locations are appropriately received. The band information table is preferably periodically updated. Alternatively, the band information table is updated according to need so as not to exceed the maximum update period.

TABLE 5

PRIORITY RANK ORDER TABLE

| PRIORITY RANK ORDER | TRANSMITTING TERMINAL |
|---|---|
| 1 | 01ab |
| 2 | 01ac |
| 3 | 01ad |
| ... | ... |

The priority rank order management DB 1005 including a priority rank order table is constructed in the storage unit

1000. In the priority rank order table, the transmitting terminals 10ab through 10ad, etc., are registered in association with priority rank orders. As the value of the priority rank order becomes smaller (that is, as the priority rank order becomes higher), the image data of the corresponding transmitting terminal 10 is displayed with higher priority on the display 120. The relay device 30 updates the priority rank order table, such that the priority rank order increases for the transmitting terminal 10 at another location that has sent voice sound data. Therefore, in the priority rank order table, the priority rank order tends to be higher for a location (transmitting terminal 10) that has recently emitted voice sound. Accordingly, the image data of a location (transmitting terminal 10) that frequently emits voice sound can be easily displayed on the display 120.

Note that in the above descriptions, the information is referred to as a DB or a table as a matter of convenience; however, the information stored in the storage unit 1000 does not have to be stored in the form of a DB or a table. The same applies to the following descriptions.

(Functional Configuration of Transmitting Terminal)

Next, referring to FIGS. 5 and 7, a detailed description is given of the functional configuration of the transmitting terminal 10. The transmitting/receiving unit 11 of the transmitting terminal 10 is realized by instructions from the CPU 101 and the network I/F 111 illustrated in FIG. 5. The transmitting/receiving unit 11 sends and receives various kinds of data with the relay device 30 and the transmission management system 50 via the communication network 2. The transmitting/receiving unit 11 starts receiving state information indicating the state of each of the terminals that are candidate destinations, from the transmission management system 50, before starting communication with the desired destination terminal. Note that the state information does not only indicate the operating state of each transmitting terminal 10 (whether the transmitting terminal 10 is online or offline), but also indicates detailed states such as whether the transmitting terminal 10 is online and is also performing communication or whether the user is away from the transmitting terminal 10, etc. The transmitting/receiving unit 11 is an example of a receiver.

The login requesting unit 12 is realized by instructions from the CPU 101 illustrated in FIG. 5. The login requesting unit 12 is triggered by the acceptance of the power being turned on, to automatically send login request information from the transmitting/receiving unit 11 to the transmission management system 50 via the communication network 2. The login request information indicates a request to log in and the IP address of the request source terminal at the present time point. Furthermore, when the user turns the power switch 109 off from the on state, the transmitting/receiving unit 11 sends state information indicating to turn off the power to the transmission management system 50, and then the operation input accepting unit 21 completely turns off the power. Accordingly, the transmission management system 50 is able to recognize that the transmitting terminal 10 has switched to power off from power on.

The voice sound inputting unit 13 is realized by instructions from the CPU 101 and the voice sound input output I/F 116 illustrated in FIG. 5. After the user's voice sound is converted into voice sound signals by the microphone 114, the voice sound inputting unit 13 inputs voice sound data relevant to the voice sound signals.

The voice sound outputting unit 14 is realized by instructions from the CPU 101 and the voice sound input output I/F 116 illustrated in FIG. 5. The voice sound outputting unit 14 outputs voice sound signals relevant to voice sound data to the speaker 115, and causes the speaker 115 to output voice sound.

The image processing unit 15 is realized by instructions from the CPU 101 illustrated in FIG. 5. The image processing unit 15 performs image processing on the images and display data (when display data is to be sent) to be sent by the transmitting terminal 10. For example, the image processing unit 15 performs a noise process, increases the clarity, and adjusts the aspect ratio, etc.

The video encoding unit 16 is realized by instructions from the CPU 101 and the display I/F 117 illustrated in FIG. 5, etc. The video encoding unit 16 encodes (including compressing and encrypting) the images and display data to be sent by the transmitting terminal 10. Note that the video encoding unit 16 also encodes voice sound.

The video decoding unit 17 is realized by instructions from the CPU 101 and the display I/F 117 illustrated in FIG. 5, etc. The video decoding unit 17 decodes (including decompressing and decrypting) the image data and display data received by the transmitting terminal 10. Note that the video decoding unit 17 also decodes voice sound.

The band information acquiring unit 18 is realized by instructions from the CPU 101 and the network I/F 111 illustrated in FIG. 5. The band information acquiring unit 18 acquires the present reception band and transmission band in the communication network 2. The reception band and transmission band are registered in the band information table. For example, the band information acquiring unit 18 measures the average communication speed with the transmission management system 50 and the relay device 30, and acquires band information from the transmission management system 50 and the relay device 30. Instead of applying the actual communication speed as the band that can be used, for example, the band information acquiring unit 18 may obtain the maximum communication speed within a certain period, and apply the obtained value as the band that can be used. The band information acquiring unit 18 is an example of a band information acquirer.

The participant information acquiring unit 19 is realized by instructions from the CPU 101 illustrated in FIG. 5. The participant information acquiring unit 19 acquires information relevant to the terminals participating in the present conference, and registers the information in the participant information table in the participant information DB 1003. The information registered in the participant information table is acquired from the transmission management system 50 and the relay device 30. The participant information acquiring unit 19 is an example of a number acquirer.

The operation input accepting unit 21 is realized by instructions from the CPU 101, the operation buttons 108, and the power switch 109 illustrated in FIG. 5. The operation input accepting unit 21 accepts various kinds of input by the user. For example, when the user switches the power switch 109 illustrated in FIG. 5 to a power-on state, the operation input accepting unit 21 illustrated in FIG. 7 accepts the instruction for power-on and turns on the power.

The imaging unit 22 is realized by instructions from the CPU 101, the camera 112, and the imaging element I/F 113 illustrated in FIG. 5. The imaging unit 22 captures an image of a subject, and outputs image data obtained by capturing the image.

Figure 8:
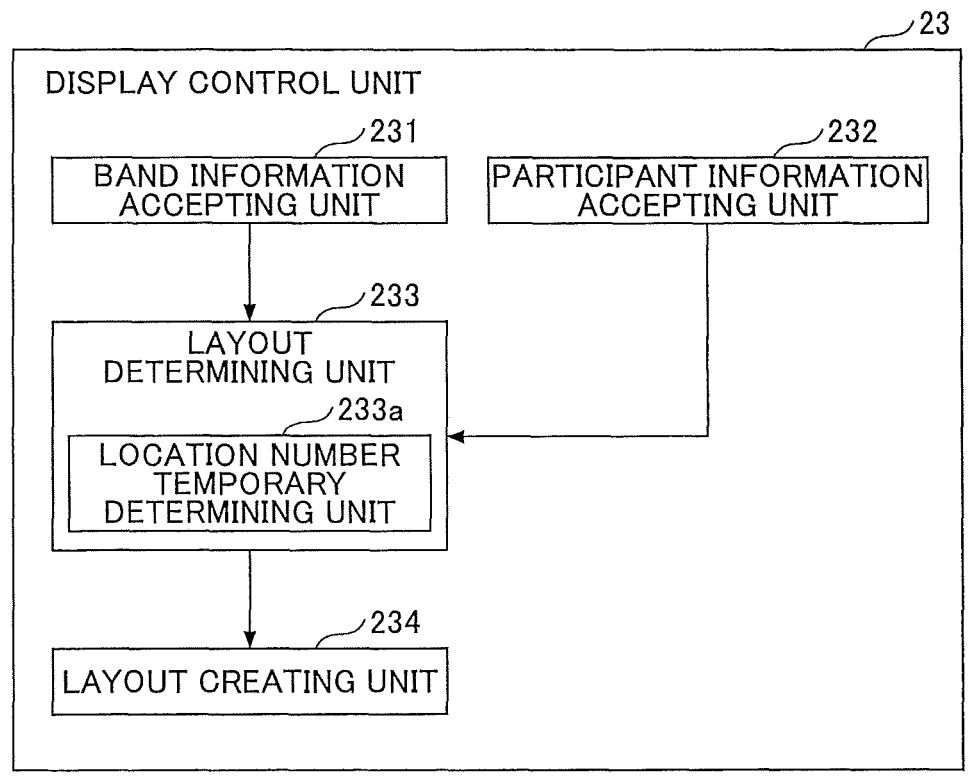
FIG. 8 is a functional block diagram of a display control unit according to an embodiment of the present invention.

The display control unit 23 is realized by instructions from the CPU 101 and the display I/F 117 illustrated in FIG. 5. The display control unit 23 generates the conference screen 501 and implements control to send image data to the display 120. Furthermore, details of functions of the display control unit 23 are illustrated in FIG. 8. The display control unit 23 is an example of a display processor.

The destination list creating unit 24 is realized by instructions from the CPU 101 illustrated in FIG. 5. The destination list creating unit 24 creates and updates a destination list based on the state information of the transmitting terminals 10 that are candidate destinations received from the transmission management system 50. In the destination list, the states of the transmitting terminals 10 that are candidate destinations are indicated by icons.

Furthermore, the storage/read processing unit 29 is realized by instructions from the CPU 101 and the SSD 105 illustrated in FIG. 5. The storage/read processing unit 29 stores various kinds of data in the storage unit 1000 and performs processes of reading various kinds of data stored in the storage unit 1000. Note that in the storage unit 1000, information other than the information illustrated in FIG. 7 is stored. For example, every time image data, voice sound data, or display data is received from a destination terminal during a call, the received data is used to overwrite the stored data.

<<Functional Configuration of Transmission Management System>>

The transmission management system 50 includes a transmitting/receiving unit 51, a terminal authenticating unit 52, a state managing unit 53, a terminal state acquiring unit 54, a session managing unit 55, a terminal extracting unit 56, and a storage/read processing unit 59. These units are functions that are realized or means that are provided as any of the elements illustrated in FIG. 6 operates in response to an instruction from the CPU 301 according to a management device-use program 5010 loaded in the RAM 303 from the HDD 305.

Furthermore, the transmission management system 50 includes a storage unit 5000 that is constructed by the HDD 305, the RAM 303, and the ROM 302, etc., illustrated in FIG. 6. Various databases stored in the storage unit 5000 are described below.

TABLE 6

RELAY DEVICE MANAGEMENT TABLE

| RELAY DEVICE ID | OPERATING STATE | RECEPTION TIME AND DATE | IP ADDRESS OF RELAY DEVICE | MAXIMUM DATA TRANSMISSION SPEED (Mbps) |
|---|---|---|---|---|
| 111a | ONLINE | 2013.11.10.13:00 | 1.2.1.2 | 100 |
| 111b | ONLINE | 2013.11.10.13:10 | 1.2.2.2 | 1000 |
| 111c | OFFLINE | 2013.11.10.13:20 | 1.3.1.2 | 100 |
| 111d | ONLINE | 2013.11.10.13:30 | 1.3.2.2 | 10 |

A relay device management DB 5001 including a relay device management table is constructed in the storage unit 5000. In the relay device management table, the operating state of each relay device 30, the reception time and date at which the state information indicating the operating state has been received at the transmission management system 50, the IP address of the relay device 30, and the maximum data transmission speed (Mbps) in the relay device 30 are managed in association with the relay device ID of each of the relay devices 30.

TABLE 7

TERMINAL AUTHENTICATION MANAGEMENT TABLE

| TERMINAL ID | PASSWORD |
|---|---|
| 01aa | aaaa |
| 01ab | abab |
| 01ac | acac |
| ... | ... |

Furthermore, a terminal authentication management DB 5002 including a terminal authentication management table is constructed in the storage unit 5000. In the terminal authentication management table, passwords are managed in association with the communication IDs of all of the transmitting terminals 10 managed by the transmission management system 50.

TABLE 8

TERMINAL MANAGEMENT TABLE

| COMMUNICATION ID | NAME | OPERATING STATE | RECEPTION TIME AND DATE | IP ADDRESS |
|---|---|---|---|---|
| 01aa | AA CONFERENCE TERMINAL | ONLINE | 2013.11.10.13:40 | 1.2.1.3 |
| 01ab | AB CONFERENCE TERMINAL | ONLINE | 2013.11.09.12:00 | 1.2.1.4 |
| 01ac | AC CONFERENCE TERMINAL | ONLINE | 2013.11.11.13:00 | 1.2.1.5 |
| 01ad | AD CONFERENCE TERMINAL | ONLINE | 2013.11.10.13:45 | 1.2.2.3 |
| 01bb | BB CONFERENCE TERMINAL | OFFLINE | 2013.11.10.13:50 | 1.2.2.4 |

Furthermore, a terminal management DB 5003 including a terminal management table is constructed in the storage unit 5000. In the terminal management table, a name (destination name) used when the transmitting terminal 10 is a destination, the operating state of each transmitting terminal 10, the reception time and date when login request information described below is received at the transmission management system 50, and the IP address of the transmitting terminal 10 are managed in association with the communication ID of each transmitting terminal 10.

TABLE 9

DESTINATION LIST MANAGEMENT TABLE

| COMMUNICATION ID | DESTINATION LIST |
|---|---|
| 01aa | 01ab, 01ac, 01ad, 01bb |
| 01ab | 01aa, 01ac, 01ad, 01bb |
| 01ac | 01aa, 01ab, 01ad, 01bb |
| 01ad | 01aa, 01ab, 01ac, 01bb |
| 01bb | 01aa, 01ab, 01ac, 01ad |
| ... | ... |

Furthermore, a destination list management DB 5004 including a destination list management table is constructed in the storage unit 5000. In the destination list management table, all of the communication IDs of the destination terminals registered as candidate destination terminals are managed in association with the communication ID of the request source terminal requesting to start a call in a TV conference. For example, in the destination list management table as indicated in Table 9, when a request source terminal (transmitting terminal 10aa) having a communication ID "01aa" makes a request to start a call in a TV conference, the candidate destination terminals for this request source terminal are the transmitting terminal 10ab having a communication ID of "01ab", the transmitting terminal 10ac having a communication ID of "01ac", the transmitting terminal 10ad having a communication ID of "01ad", and the transmitting terminal 10bb having a communication ID of "01bb".

TABLE 10

SESSION MANAGEMENT TABLE

| SESSION ID | RELAY DEVICE ID | REQUEST SOURCE TERMINAL ID | DESTINATION TERMINAL ID | CONFERENCE ID |
|---|---|---|---|---|
| se1 | 111a | 01aa | 01ac | C01 |
| se2 | 111b | 01aa | 01ab | C01 |
| se3 | 111d | 01aa | 01ad | C01 |
| ... | ... | ... | ... | ... |

Furthermore, a session management DB 5005 including a session management table is constructed in the storage unit 5000. In the session management table, a relay device ID of the relay device 30 used for relaying image data and voice sound data, a communication ID of a request source terminal, a communication ID of a destination terminal, and a conference ID are managed in association with each session ID used for executing a session of selecting the relay device 30. The session ID is an ID for identifying a session, and the transmitting terminals 10 participating in the same conference may not necessarily be included in the same session. On the other hand, the same conference ID is applied to the transmitting terminals 10 participating in the same conference.

(Functional Configuration of Transmission Management System)

Next, a detailed description is given of the functional configuration of the transmission management system 50. The transmitting/receiving unit 51 is realized by instructions from the CPU 301 and the network I/F 309 illustrated in FIG. 6. The transmitting/receiving unit 51 sends and receives various kinds of data with the transmitting terminal 10 or the relay device 30 via the communication network 2. The transmitting/receiving unit 51 is an example of a reporter.

The terminal authenticating unit 52 is realized by instructions from the CPU 301 illustrated in FIG. 6. The terminal authenticating unit 52 authenticates the transmitting terminal 10 by using, as search keys, the communication ID and the password included in the login request information received via the transmitting/receiving unit 51. That is, the terminal authenticating unit 52 searches the terminal authentication management DB 5002, and authenticates a terminal by determining whether the same communication ID and password are managed in the terminal authentication management DB 5002. Note that the authentication method is not so limited, and client certificate (an authentication method using a public key and a secret key) may be used.

The state managing unit 53 is realized by instructions from the CPU 301 illustrated in FIG. 6. The state managing unit 53 manages the operating state of a request source terminal that has made a login request. The state managing unit 53 manages the operating state by storing the communication ID of the request source terminal, the operating state of the request source terminal, the reception time and date at which the login request information is received at the transmission management system 50, and the IP address of the request source terminal in association with each other in the terminal management DB 5003.

Furthermore, when the user switches the power switch 109 of the transmitting terminal 10 to a power-off state from a power-on state, state information indicating to turn off the power is sent from the transmitting terminal 10 to the transmission management system 50. Based on the received state information, the state managing unit 53 changes the operating state in the terminal management DB 5003 from online to offline.

The terminal extracting unit 56 is realized by instructions from the CPU 301 illustrated in FIG. 6. The terminal extracting unit 56 uses the communication ID of the request source terminal that has made a login request as a search key, to search the destination list management DB 5004, and extract a communication ID that is a candidate destination terminal that can make a call with the request source terminal. Furthermore, the terminal extracting unit 56 uses the communication ID of the request source terminal that has made a login request as a search key, to search the destination list management DB 5004, and extract a communication ID of another request source terminal in which the communication ID of the request source terminal is registered as a candidate destination terminal.

The terminal state acquiring unit 54 is realized by instructions from the CPU 301 illustrated in FIG. 6. The terminal state acquiring unit 54 uses, as a search key, the communication ID of the candidate destination terminal extracted by the terminal extracting unit 56, to search the terminal management DB 5003 and acquire the operating state of each communication ID extracted by the terminal extracting unit 56. Accordingly, the terminal state acquiring unit 54 is able to acquire the operating state of the candidate destination terminal that can make a call with the request source terminal that has made the login request.

The session managing unit 55 is realized by instructions from the CPU 301 illustrated in FIG. 6. The session managing unit 55 stores and manages a session ID, a communication ID of the request source terminal, a communication ID of the destination terminal, and a conference ID in association with each other in the session management DB 5005.

The storage/read processing unit 59 is realized by instructions from the CPU 301 and the HDD 305 illustrated in FIG. 6. The storage/read processing unit 59 stores various kinds of data in the storage unit 5000 and reads various kinds of data stored in the storage unit 5000.

<<Functional Configuration of Relay Device>>

The relay device 30 includes a transmitting/receiving unit 31, a state detecting unit 32, and a storage/read processing unit 39. These units are functions that are realized or means that are provided as any of the elements illustrated in FIG. 6 operates in response to an instruction from the CPU 301 according to a relay device-use program 3010 loaded in the RAM 303 from the HD 304.

Furthermore, the relay device 30 includes a storage unit 3000. The storage unit 3000 is constructed by the HD 304 illustrated in FIG. 6. The storage unit 3000 stores a relay management DB 3001 and the relay device-use program 3010.

TABLE 1

RELAY MANAGEMENT TABLE

| CONFERENCE ID | COMMUNICATION ID | IP ADDRESS | DATA ID |
|---|---|---|---|
| C01 | 01aa | 1.2.1.3 | Ap, Av, Ad |
|  | 01ab | 1.2.1.4 | Bp, Bv, Bd |
|  | 01ac | 1.2.1.5 | Cp, Cv, Cd |
|  | 01ad | 1.2.2.3 | Dp, Dv, Dd |

The relay management DB 3001 including a relay management table as indicated in Table 11 is constructed in the storage unit 3000. In the relay management table, the communication ID, the IP address, and the data ID of the transmitting terminal 10 participating in a conference are registered in association with a conference ID of the conference.

The transmitting/receiving unit 31 of the relay device 30 is realized by instructions from the CPU 301 and the network I/F 309 illustrated in FIG. 6. The transmitting/receiving unit 31 sends and receives various kinds of data with the transmitting terminal 10 or the transmission management system 50 via the communication network 2.

The state detecting unit 32 is realized by instructions from the CPU 301 illustrated in FIG. 6. The state detecting unit 32 detects the operating state of the relay device 30 in which the state detecting unit 32 is included. As the operating state, there are states including "online", "offline", "during call", and "temporarily interrupted", etc.

The storage/read processing unit 39 is realized by instructions from the CPU 301 and the HDD 305 illustrated in FIG. 6. The storage/read processing unit 39 stores various kinds of data in the storage unit 3000 and reads various kinds of data stored in the storage unit 3000.

<<Functional Configuration of Display Control Unit>>

FIG. 8 is a functional block diagram of the display control unit 23 according to an embodiment of the present invention. The display control unit 23 includes a band information accepting unit 231, a participant information accepting unit 232, a layout determining unit 233, and a layout creating unit 234. The band information accepting unit 231 accepts the reception band registered in the band information table by the band information acquiring unit 18.

The participant information accepting unit 232 accepts information relevant to the present participating terminals managed in the participant information table managed by the participant information acquiring unit 19.

The layout determining unit 233 includes a location number temporary determining unit 233a. The location number temporary determining unit 233a temporarily determines the display location number by referring to the display location number management DB 1001 based on the reception band. The layout determining unit 233 determines whether the reception band has changed, refers to the participating terminal number, and uses the display location number determined by the location number temporary determining unit 233a, to determine the final display location number. Note that when the display location number is determined, the layout can be determined. Details are described below referring to FIG. 14. The location number temporary determining unit 233a is an example of a first display number determiner, and the layout determining unit 233 is an example of a second display number determiner.

The layout creating unit 234 refers to the layout management table according to the display location number determined by the layout determining unit 233, and creates the conference screen 501.

<<Example of Layout>>

FIG. 9 is a diagram illustrating an example of a layout in a case where the display location number is two locations. The display location number is two locations, and therefore two images are displayed at the same time. The arrangements of the image of the first location and the image of the second location are registered in the layout management table described above. Note that there are cases where the display data is displayed, and therefore the layout may be determined according whether there is display data. Furthermore, the display data may be handled as one image data item.

<From Start of Communication to Establishment of Session>

Figure 10:
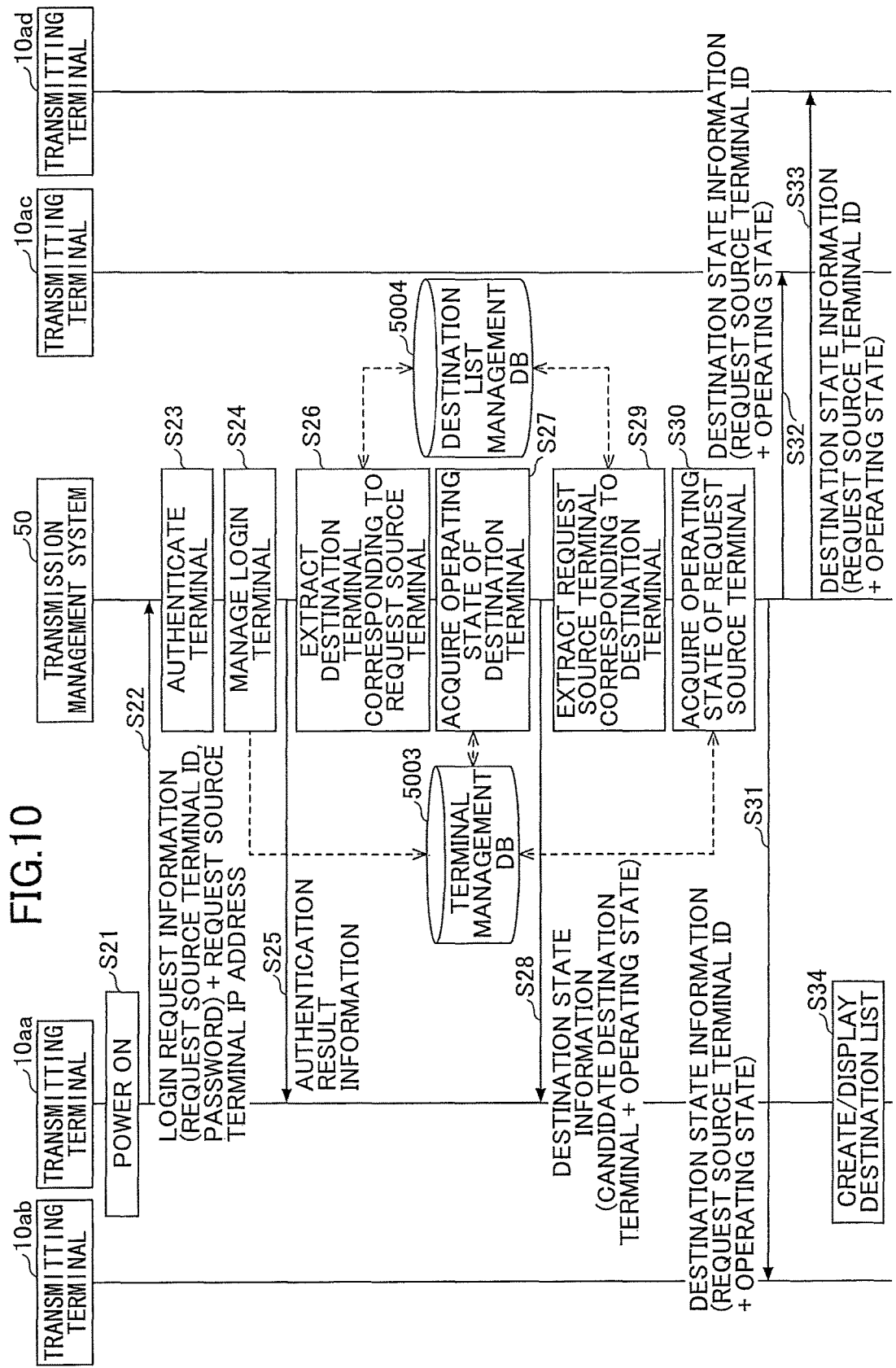
FIG. 10 is a sequence diagram of an example of a process of a preparation stage for starting communication between a plurality of transmitting terminals according to an embodiment of the present invention.

FIG. 10 is a sequence diagram of an example of a process of a preparation stage for starting communication between a plurality of transmitting terminals 10. Referring to FIG. 10, a description is given of a preparation process for the transmitting terminal 10aa to start communication with the transmitting terminals 10ac, 10ab, and 10ad.

First, when the user switches the power switch 109 to a power-on state, the operation input accepting unit 21 of the transmitting terminal 10aa accepts the instruction for power-on and turns on the power (step S21). Then, the login requesting unit 12 of the transmitting terminal 10aa is triggered by the reception of power-on, to automatically send login request information indicating a login request from the transmitting/receiving unit 11 to the transmission management system 50 via the communication network 2 (step S22). The login request may be sent at any timing according to a user's operation, other than the timing when the power is turned on. This login request information includes a communication ID for identifying the transmitting terminal 10aa that is the request source and a password. Note that when the login request information is sent from the transmitting terminal 10aa to the transmission management system 50, the transmission management system 50 that is the receiving side is able to recognize the "IP address" of the transmitting terminal 10aa. Note that when the mobile terminal 20 is the request source terminal, the operation input accepting unit 21 accepts a login operation by the user, and sends the communication ID and the password to the transmission management system 50.

Next, the terminal authenticating unit 52 of the transmission management system 50 determines whether the same communication ID and password as the communication ID and password, which are included in the login request information received via the transmitting/receiving unit 51, are managed, and performs terminal authentication based on the determination result (step S23). In the present embodiment, the description is given assuming that the authentication is successful.

When the transmitting terminal 10 is successfully authenticated by the terminal authenticating unit 52, the state managing unit 53 stores the communication ID, the "operating state", and the "communication state" of the transmitting terminal 10aa; the "reception time" when the above login request information is received; and the "IP address" of the transmitting terminal 10aa in association with each other, in the terminal management table (step S24). Note that the "operating state" at this time is "online".

The transmitting/receiving unit 51 of the transmission management system 50 sends the authentication result information indicating the authentication result obtained by the terminal authenticating unit 52, to the transmitting terminal 10aa that has requested to log in via the communication network 2 (step S25).

The terminal extracting unit 56 of the transmission management system 50 uses "01aa", which is the communication ID of the transmitting terminal 10aa that has made the login request, as a search key to search the destination list management table, and reads and extracts the communication IDs of the transmitting terminal candidates that can communicate with the transmitting terminal 10aa (step S26). Here, the terminal extracting unit 56 extracts "01ab", "01ac", "01ad", and "01bb", which are the communication IDs of the destination terminals (10ab, 10ac, 10ad, and 10bb) corresponding to "01aa" that is the communication ID of the transmitting terminal 10aa.

Next, the terminal state acquiring unit 54 uses the communication IDs ("01ab", "01ac", "01ad", and "01bb") of the transmitting terminals 10ab, 10ac, 10ad, and 10bb extracted by the terminal extracting unit 56 as search keys to search the terminal management table, and reads the "operation state" for each communication ID (step S27). Here, it is assumed that the transmitting terminals 10ab, 10ac, and 10ad are "online" and the transmitting terminal 10bb is "offline".

Next, the transmitting/receiving unit 51 sends destination state information including the communication IDs ("01ab", "01ac", "01ad", and "01bb") extracted by the terminal extracting unit 56 and the "operating states" to the transmitting terminal 10aa via the communication network 2 (step S28). Accordingly, the transmitting terminal 10aa is able to recognize the "operation states" at the present time point of the transmitting terminals (10ab, 10ac, 10ad, and 10bb) that can communicate with the transmitting terminal 10aa.

Furthermore, the terminal extracting unit 56 of the transmission management system 50 uses "01aa", which is the communication ID of the transmitting terminal 10aa that has made the login request, as a search key to search the destination list management table, and extracts the communication ID of the transmitting terminal 10 in which the communication ID "01aa" is registered as a candidate destination terminal (step S29). In the above destination list management table, the communication IDs of the other extracted transmitting terminals 10 are "01ab", "01ac", "01ad", and "01bb".

Next, the terminal state acquiring unit 54 of the transmission management system 50 uses "01aa", which is the communication ID of the transmitting terminal 10aa that has made the login request, as a search key to search the terminal management table, and acquire the "operating state" of the transmitting terminal 10aa (step S30).

Then, the transmitting/receiving unit 51 sends destination state information including "01aa" that is the communication ID of the transmitting terminal 10aa acquired in step S30 and the "operating state" indicating "online", to the transmitting terminal 10 having an "operating state" indicating "online" in the terminal management table among the transmitting terminals 10 having the communication IDs ("01ab", "01ac", "01ad", and "01bb") extracted in step S29 (steps S31, S32, and S33). Therefore, the destination state information is sent to the transmitting terminals 10ab, 10ac, and 10ad. Note that when the transmitting/receiving unit 51 sends the destination state information to the transmitting terminals 10ab, 10ac, and 10ad, the transmitting/receiving unit 51 refers to the "IP addresses" of the transmitting terminals 10 managed in the terminal management table, based on the communication IDs ("01ab", "01ac", and "01ad").

When the destination list creating unit 24 of the transmitting terminal 10aa receives the information of the destination list and the "operating states" of the candidate destination terminals, the destination list creating unit 24 creates a destination list screen, and displays the destination list screen on the display 120 (step S34). In this case, in the destination list screen, the names of the transmitting terminals 10ab, 10ac, and 10ad and "online" expressing the "operating state" are displayed. Also, in the destination list screen, the name of the transmitting terminal 10bb and "offline" expressing the "operating state" are displayed.

On the other hand, at the other transmitting terminals 10ab, 10ac, and 10ad, the same process as the process of FIG. 10 is performed, and the destination list screen is displayed on the display 120 of the transmitting terminal 10 having the transmitting terminals 10ab, 10ac, and 10ad as the candidate destinations.

Figure 11:
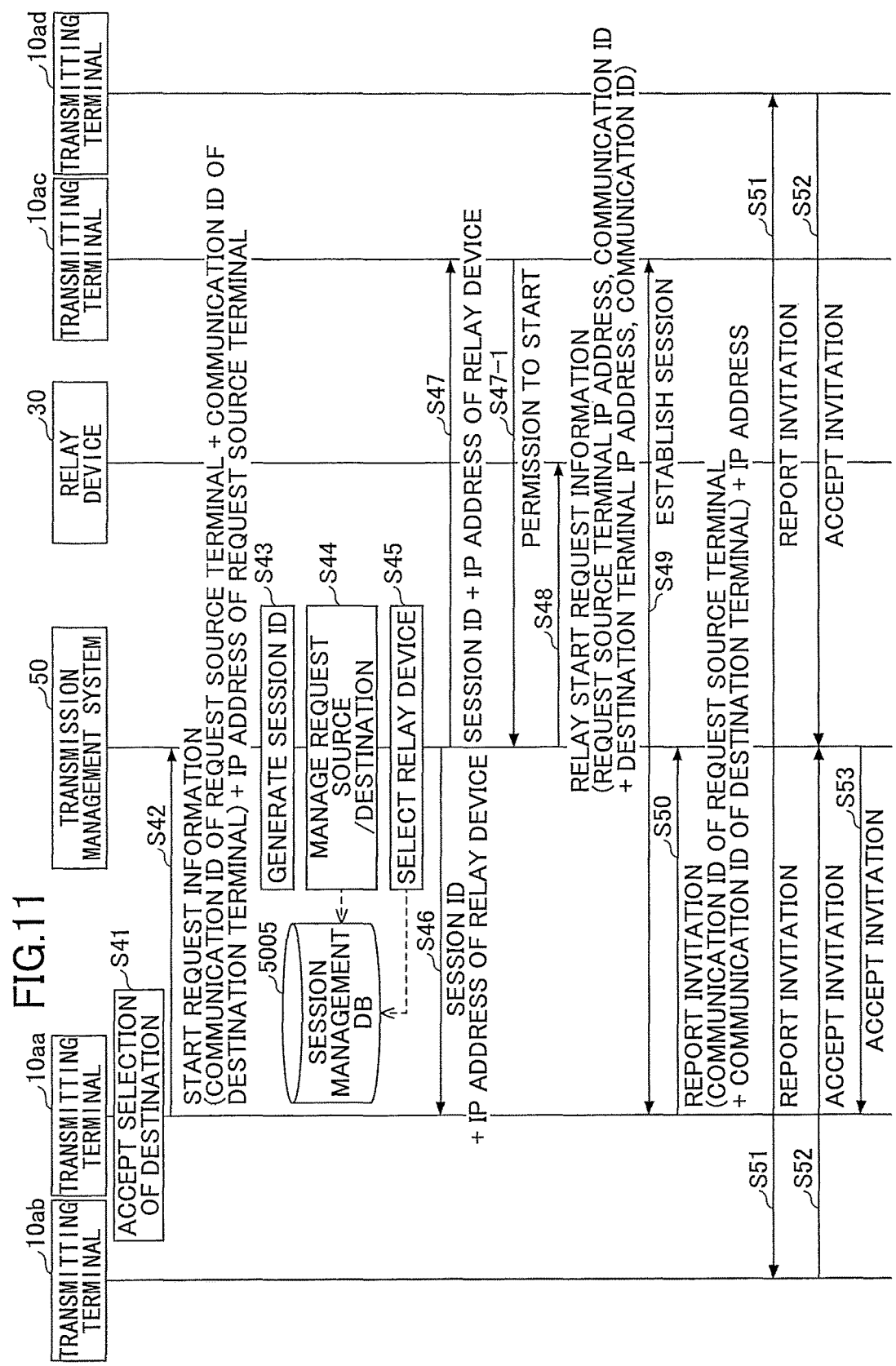
FIG. 11 is a sequence diagram of an example of a process of establishing a session among a plurality of transmitting terminals according to an embodiment of the present invention.

FIG. 11 is a sequence diagram of an example of a process of establishing a session among a plurality of transmitting terminals 10.

When the user selects, for example, a destination terminal having a communication ID of "01ac" among the communication IDs displayed on the destination list screen by operating the operation buttons 108 of the transmitting terminal 10aa, the operation input accepting unit 21 accepts a request for starting connection (step S41).

The transmitting/receiving unit 11 of the transmitting terminal 10aa sends start request information indicating a request to start connection to the transmission management system 50 (step S42). The start request information includes the communication ID "01aa" of the transmitting terminal 10aa and "01ac" that is the "communication ID of the destination terminal". Accordingly, the transmission management system 50 recognizes the "IP address" of the request source terminal (transmitting terminal 10aa).

Next, the session managing unit 55 of the transmission management system 50 generates a "session ID" (step S43). An ID that does not overlap other IDs is generated as the "session ID".

Then, the transmission management system 50 manages and stores the generated "session ID", the communication ID "01aa" of the request source terminal (transmitting terminal 10aa), and the communication ID "01ac" of the destination terminal (transmitting terminal 10ac) in association with the each other in the session management DB 5005 (step S44). Furthermore, the transmission management system 50 applies a conference ID.

Furthermore, the session managing unit 55 of the transmission management system 50 determines an appropriate relay device 30 for performing communication between the request source terminal and the destination terminal (step S45). The method of determining the relay device 30 may be, for example, a method of selecting the relay device 30 in the communication network 2 having the widest band for reception and transmission.

Note that a session may be directly established between the request source terminal and the destination terminal without selecting the relay device 30, or a session may be established via the transmission management system 50, without selecting the relay device 30.

Then, the transmitting/receiving unit 51 of the transmission management system 50 sends the "session ID" generated in step S43 and the "IP address" of the relay device 30 determined in step S45 to the request source terminal (transmitting terminal 10aa) and the destination terminal (transmitting terminal 10ac) (steps S46 and S47).

The display control unit 23 of the transmitting terminal 10ac displays the communication ID of the request source terminal (transmitting terminal 10aa) on the display 120, and the operation input accepting unit 21 accepts the user's permission for a TV conference. Then, the transmitting/receiving unit 11 of the transmitting terminal 10*ac* sends the start permission to the transmission management system 50 (step S47-1).

Next, the state managing unit 53 of the transmission management system 50 sends the "IP address" and the communication ID of the request source terminal (transmitting terminal 10*aa*), the "IP address" and the communication ID of the destination terminal (transmitting terminal 10*ac*), and the conference ID, as relay start request information, to the relay device 30 (step S48). The relay device 30 manages the communication IDs in association with the conference ID in the relay management table. Furthermore, the relay device 30 applies a data ID that does not overlap any of the communication IDs. The data ID may or may not be reported to each of the transmitting terminals 10. When the data ID is reported, the transmitting terminal 10 applies the data ID to content data and sends the content data to the relay device 30. When the data ID is not reported, the relay device 30 identifies the transmitting terminal 10 based on the IP address, etc., applies a data ID to the content data, and sends the content data to the transmitting terminal 10.

When the transmitting/receiving unit 31 of the relay device 30 receives the communication IDs from the transmission management system 50, the transmitting/receiving unit 31 detects that the transmitting terminal 10*aa* and the transmitting terminal 10*ac* are the transmission destinations of the content data based on the communication IDs. Accordingly, a session is established between the request source terminal (transmitting terminal 10*aa*) and the destination terminal (transmitting terminal 10*ac*) (step S49). When the session is established, the transmitting terminal 10*aa* sends content data to the transmitting terminal 10*ac* via the relay device 30, and the transmitting terminal 10*ac* sends content data to the transmitting terminal 10*aa* via the relay device 30.

Next, the user of the transmitting terminal 10*aa* sends an invitation report to the transmission management system 50 (step S50). An invitation report is a report for inviting another transmitting terminal 10 to participate in the TV conference in which a session is already established. The invention report includes the communication ID "01aa" of the transmitting terminal 10*aa* that has sent the invitation report and the communication IDs "01ab" and "01ad" of the transmitting terminals 10*ab* and 10*ad* that are invited. Furthermore, the transmission management system 50 acquires the "IP address" of the transmitting terminal 10*aa* that has sent the invitation report.

When the transmitting/receiving unit 51 of the transmission management system 50 receives the invitation report, the terminal state acquiring unit 54 of the transmission management system 50 acquires the "IP addresses" of the invited transmitting terminals 10*ab* and 10*ad* from the terminal management table. Accordingly, the transmitting/receiving unit 51 of the transmission management system 50 sends the invitation report to the transmitting terminals 10*ab* and 10*ad* (step S51).

The display control unit 23 of the transmitting terminals 10*ab* and 10*ad* displays the communication IDs of the request source terminal (transmitting terminal 10*aa*) on the display 120 (the display 308 in the case of the mobile terminal 20), and the operation input accepting unit 21 accepts a response by the user to the invitation to the TV conference. Here, it is assumed that the user has accepted the invitation. Then, the transmitting/receiving unit 11 of the transmitting terminals 10*ab* and 10*ad* sends the acceptance to the invitation to the transmission management system 50 (step S52).

The session managing unit 55 of the transmission management system 50 applies the same conference ID as the conference ID of the transmitting terminals 10*aa* and 10*ac*, to the transmitting terminals 10*ab* and 10*ad*.

The transmitting/receiving unit 51 of the transmission management system 50 sends the invitation acceptance to the transmitting terminal 10*aa* that has sent the invitation report (step S53).

Next, the transmitting/receiving unit 51 performs the processes of steps S47 and S48 with respect to the invited transmitting terminals 10*ab* and 10*ad*. Accordingly, the transmitting terminals 10*ab* and 10*ad* are able to participate in the session of the transmitting terminals 10*aa* and 10*ac*. That is, the relay device 30 sends (transfers) the content data among the transmitting terminals 10*aa*, 10*ac*, 10*ab*, and 10*ad* of the same conference ID.

Subsequently, content data is sent and received among the request source terminal (transmitting terminal 10*aa*), the destination terminal (transmitting terminal 10*ac*), and the invited transmitting terminals 10*ab* and 10*ad*, via the relay device 30.

<Creation of Participant Information Table>

Figure 12:
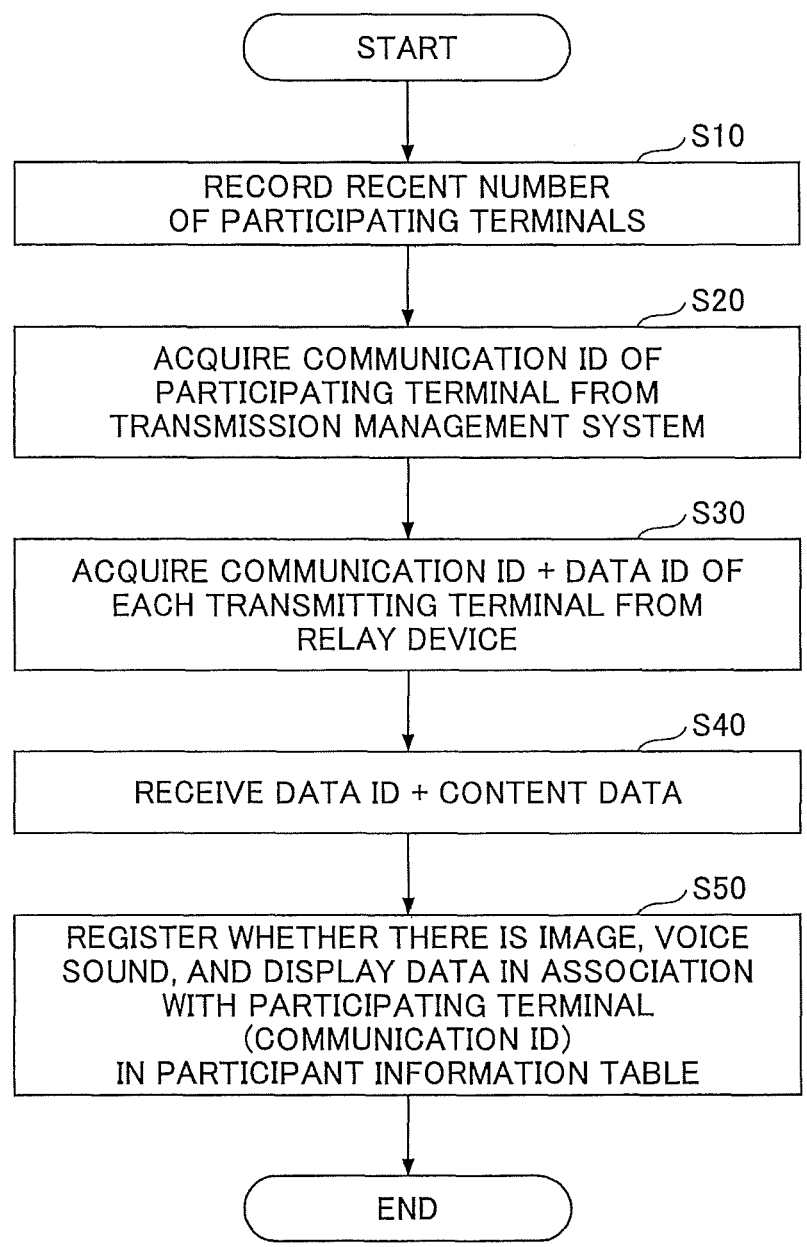
FIG. 12 is a flowchart of an example of procedures of creating a participant information table according to an embodiment of the present invention.

Next, referring to FIG. 12, a description is given of the creation the participant information table. FIG. 12 is a flowchart of an example of procedures of creating a participant information table. The procedures of FIG. 12 are repeatedly executed while the content data is being sent and received. The repeated cycle corresponds to the cycle of updating the layout of the conference screen 501. This cycle is determined based on the period of monitoring whether the reception band is stable. The cycle may be a fixed value such as several seconds through several tens of seconds. Alternatively, the tendency of the variation of the reception band may be digitized to determine the repetition cycle of the procedures of FIG. 12. For example, the cycle length may be decreased when the reception band varies frequently, and the cycle length may be increased when the reception band varies less frequently.

When the timing to determine the layout of the conference screen 501 approaches, the participant information acquiring unit 19 stores the recent number of participating terminals (participating terminal number) as the recent participating terminal 1030 in the storage unit 1000 (step S10). This number is stored for the purpose of recognizing whether there is any increase or decrease in the number of participating terminals (participating terminal number).

The participant information acquiring unit 19 acquires the communication IDs of the participating terminals from the transmission management system 50 (step S20). The communication IDs of the participating terminals are registered in the session management table.

Next, the participant information acquiring unit 19 acquires the communication IDs and the data IDs of the transmitting terminals 10 associated with the same conference ID, from the relay device 30 (step S30). The relay device 30 sends the communication IDs and the data IDs of even the transmitting terminals 10 to which the content data is not sent.

Furthermore, the transmitting terminal 10*aa* receives the data ID together with the content data from the transmitting terminal 10 sending the content data via the relay device 30 (step S40).

The participant information acquiring unit 19 determines whether content data will actually be sent from the relay device 30 for each data ID (that is, for each of the image data, the voice sound data, and the display data) of the transmitting terminal 10, and registers whether an image, voice sound, and display data has been received in association with the communication ID (step S50). Accordingly, the participant information table is obtained.

<Procedures of Changing Layout>

Figure 13:
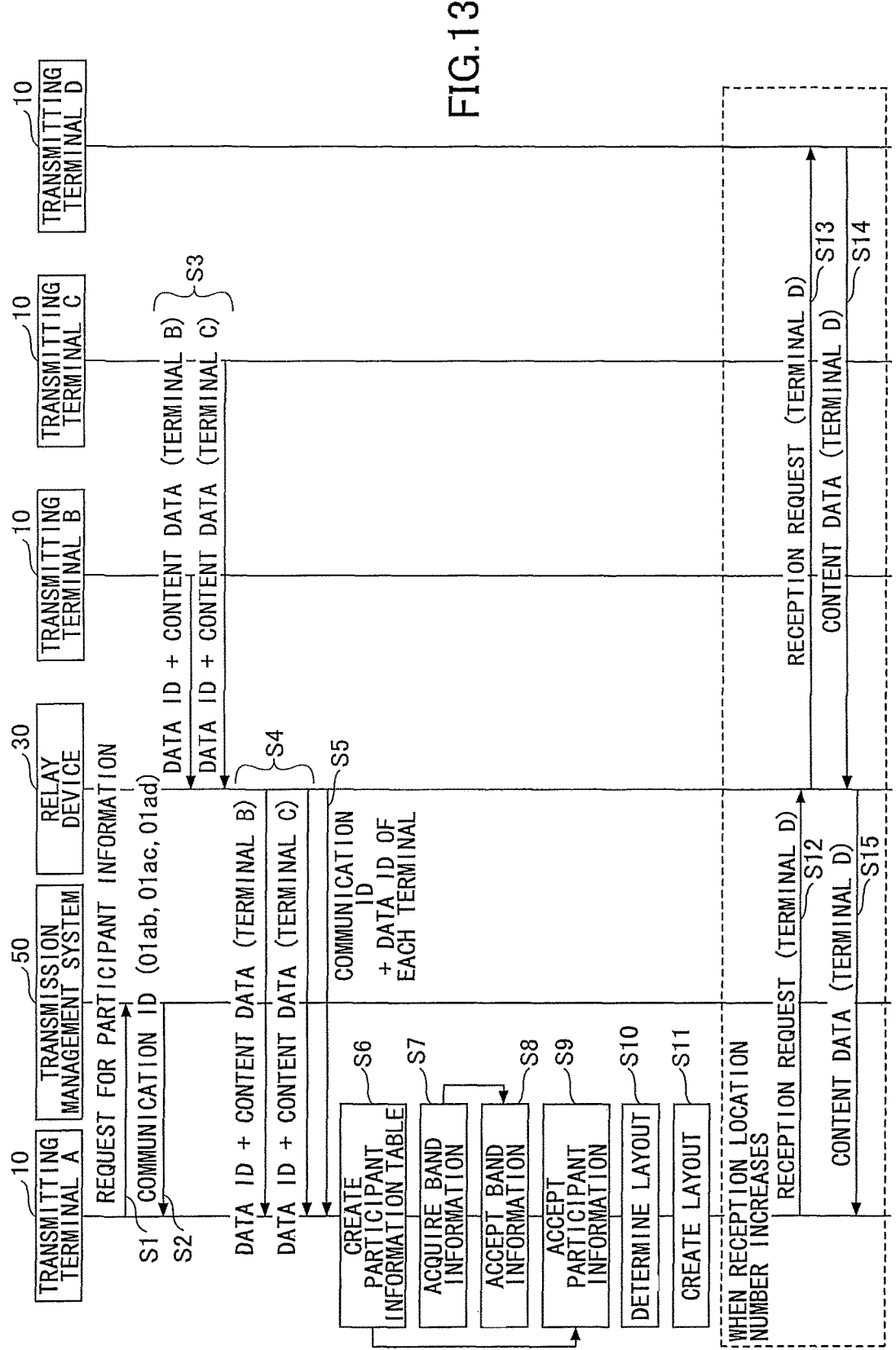
FIG. 13 is a sequence diagram of an example of overall procedures of sending and receiving content data and changing the layout by the transmitting terminal according to an embodiment of the present invention.

Referring to FIG. 13, a description is given of procedures of changing the layout performed by the transmitting terminal 10aa that is sending and receiving content data. FIG. 13 is a sequence diagram of an example of overall procedures of sending and receiving content data and changing the layout by the transmitting terminal 10aa. The procedures of FIG. 13 are repeatedly executed in cycles similar to the procedures of FIG. 12.

Step S1: The participant information acquiring unit 19 of the transmitting terminal 10aa sends a participant information request to the transmission management system 50 to detect the present participating terminals. The transmitting terminal 10aa sends a session ID for identifying the session in which the transmitting terminal 10aa itself is participating (a communication ID or a conference ID may be sent).

Step S2: The session managing unit 55 of the transmission management system 50 reads, from the session management table, the communication IDs of the transmitting terminals 10ab, 10ac, and 10ad associated with the same conference ID as the conference ID of the transmitting terminal 10aa, and sends the communication IDs to the transmitting terminal 10aa. In this case, the transmitting terminals 10ab, 10ac, and 10ad are the participating terminals.

Step S3: Here, the transmitting terminals 10ab and 10ac are sending content data to the relay device 30. The transmitting terminal 10ad is not sending content data to the relay device 30. This is because the transmitting terminal 10 that is participating in the conference (for example, the transmitting terminal 10aa) is displaying the images of the transmitting terminals 10ab and 10ac. None of the participating terminals are displaying the image of the transmitting terminal 10ad on their respective displays 120, and therefore the transmitting terminal 10ad is not sending content data. Note that the transmitting terminals 10ab and 10ac send content data together with the data ID reported from the relay device 30. Alternatively, the relay device 30 identifies the transmitting terminals 10ab and 10ac based on IP addresses, applies a corresponding data ID to the content data, and sends the content data to the transmitting terminal 10aa.

Step S4: The relay device 30 sends the content data and the data ID of the transmitting terminals 10ab and 10ac to the transmitting terminal 10aa, by using the IP address of the transmitting terminal 10aa as the destination.

Step S5: The relay device 30 sends the communication IDs of the transmitting terminals 10 and the data IDs of the transmitting terminals 10 participating in the same conference to the respective transmitting terminals 10, for example, periodically or when a change occurs in the participating terminals participating in the conference. The data IDs are sent so that the transmitting terminal 10aa is able to send separate requests for the image data, the voice sound data, and the display data to the relay device 30. The communication IDs are sent so that the transmitting terminal 10aa can associate the data ID with the transmitting terminal 10 acquired in step S1 as a participating terminal.

Step S6: The participant information acquiring unit 19 of the transmitting terminal 10aa uses the above information to create a participant information table as described by referring to FIG. 12.

Step S7: Next, the band information acquiring unit 18 of the transmitting terminal 10aa acquires band information and registers the band information in the band information table. Note that, in order to record the changes in the band information, the band information acquiring unit 18 saves the band information immediately before updating the band information, in the recent reception band 1020, and then registers the newest band information in the band information table.

Next, the display control unit 23 of the transmitting terminal 10aa determines whether the layout needs to be changed, and changes the layout if necessary.

Step S8: First, the band information accepting unit 231 of the display control unit 23 acquires band information from the band information acquiring unit 18.

Step S9: The participant information accepting unit 232 of the display control unit 23 acquires the participant information table from the participant information acquiring unit 19.

Step S10: The layout determining unit 233 determines whether to change the layout. Details are described below by referring to FIG. 14.

Step S11: The layout creating unit 234 creates the layout according to the determination result by the layout determining unit 233.

Step S12: When the layout determining unit 233 determines to increase the reception location number, the transmitting/receiving unit 11 of the transmitting terminal 10aa specifies the data ID of the transmitting terminal 10ad and sends a reception request to the relay device 30. The image data and the voice sound data are requested together as a set; however, the image data and the voice sound data may be requested separately. Note that the transmitting terminal 10aa may send this reception request to the transmitting terminal 10ad without involving the relay device 30. The IP address of the transmitting terminal 10ad can be acquired from the transmission management system 50 or the relay device 30.

Step S13: The transmitting/receiving unit 31 of the relay device 30 requests the transmitting terminal 10ad to send content data (image data and voice sound data).

Step S14: The transmitting/receiving unit 31 of the relay device 30 receives content data from the transmitting terminal 10ad. The transmitting terminal 10ad applies a data ID to the content data. Alternatively, the relay device 30 identifies the content data from the transmitting terminal 10ad based on the IP address, and applies a data ID to the content data.

Step S15: The relay device 30 sends the content data received from the transmitting terminal 10ad to the transmitting terminal 10aa together with the data ID.

As described above, the transmitting terminal 10aa receives the content data only when the content data is to be displayed, and therefore the reception band is not wastefully used.

<<Determination of Layout>>

Figure 14:
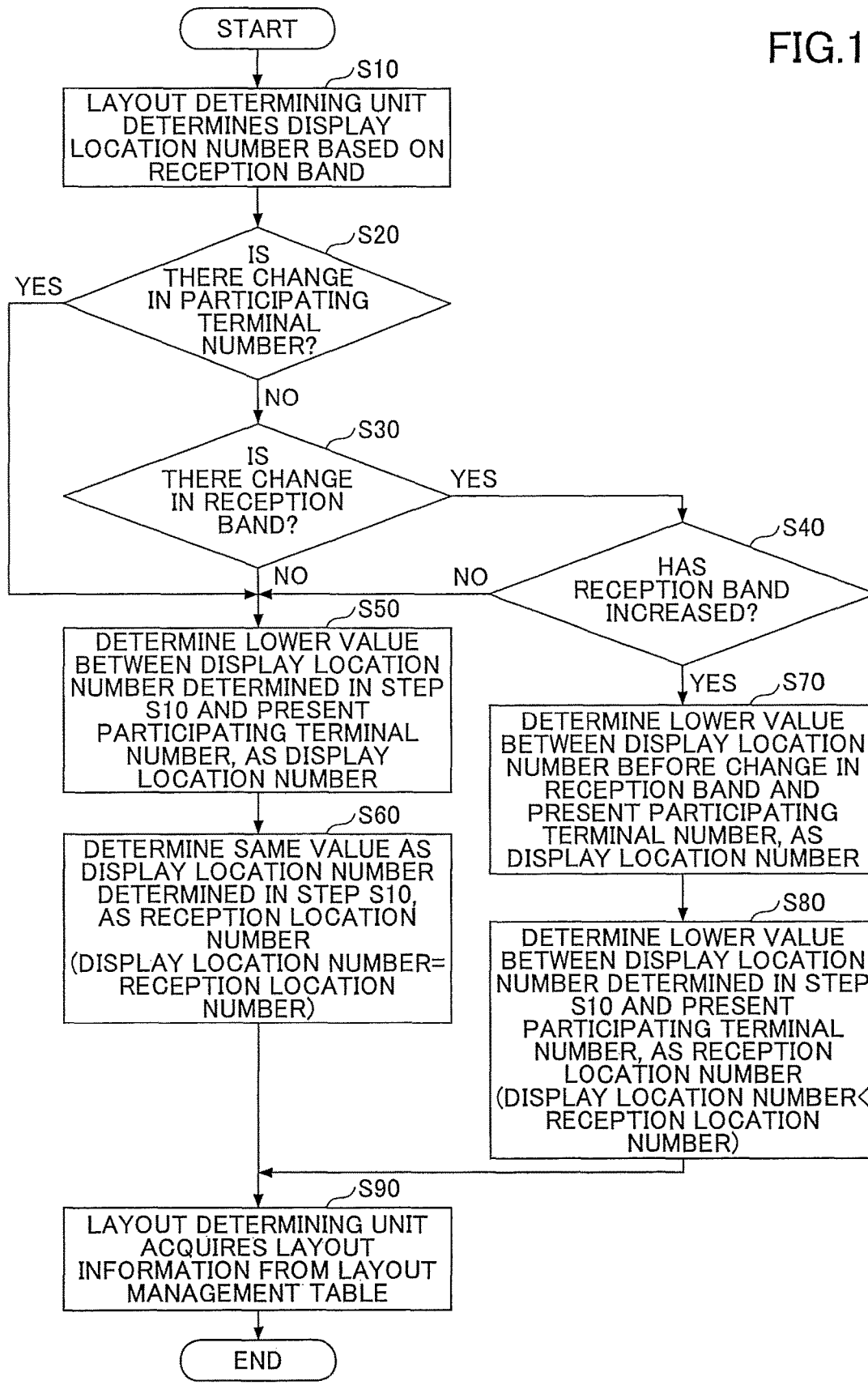
FIG. 14 is a flowchart of an example of procedures of determining the display location number and the reception location number by the display control unit of the transmitting terminal according to an embodiment of the present invention.

FIG. 14 is a flowchart of an example of procedures of determining the display location number and the reception location number by the display control unit 23 of the transmitting terminal 10aa.

The location number temporary determining unit 233a first determines the display location number (step S10). The band information is already acquired, and therefore the reception band is known. The location number temporary determining unit 233a reads the display location number matching the present reception band, from the display location number management table. As one example, it is assumed that the display location number is "3".

Next, the layout determining unit 233 determines whether there has been a change in the participating terminal number (step S20). The layout determining unit 233 reads the recent participating terminal 1030 stored in the storage unit 1000, and compares the participating terminal number of the recent participating terminal 1030 with the participating terminal number in the present participant information table.

When there is a change in the participating terminal number (YES in step S20), the layout determining unit 233 determines the lower value between the display location number determined in step S10 and the present participating terminal number, as the display location number (step S50). When there has been a change in the participating terminal number, the display location number is preferably determined according to the participating terminal number; however, it is not possible to display a number of image data items exceeding the display location number determined based on the reception band. Therefore, the display location number is determined as described with respect to step S50.

When there are no changes in the participating terminal number (NO in step S20), the layout determining unit 233 determines whether there has been a change in the reception band (step S30). The layout determining unit 233 reads the recent reception band 1020 stored in the storage unit 1000, a compares the reception band of the recent reception band 1020 with the reception band in the present band information table.

When there are no changes in the reception band (NO in step S30), the layout determining unit 233 determines the lower value between the display location number determined in step S10 and the present participating terminal number, as the display location number (step S50). Neither the participating terminal number nor the reception band has changed, and therefore the maximum number of locations (display location number) that can be displayed within the range of the number of the participating terminals, is determined as the display location number. Note that when the determination is NO in step S30, the display location number is not changed.

When there is a change in the reception band (YES in step S30), the layout determining unit 233 determines whether the reception band has increased (step S40).

When the reception band has decreased (NO in step S40), the layout determining unit 233 determines the lower value between the display location number determined in step S10 and the present participating terminal number, as the display location number (step S50). That is, the maximum number of locations that can be displayed in the decreased reception band within the range of the number of the participating terminals, is determined as the display location number.

When the reception band has increased (YES in step S40), the layout determining unit 233 determines the lower value between the display location number before performing the process of FIG. 14 (that is, the display location number in the present conference screen 501) and the present participating terminal number, as the display location number (step S60). In this case, there are no changes in the participating terminals and there are no changes in the display location number in the present conference screen 501 that is the target of comparison, and therefore there are no changes in the display location number determined in step S70. That is, when the reception band increases, there are no changes in the display location number.

After step S50, the layout determining unit 233 determines the same value as the determined display location number, as the reception location number (step S70). That is, as the display location number increases (increases only when the participating terminal number increase) and as the display location number decreases (decreases when the participating terminal number decreases or the reception band decreases), the reception location number changes accordingly. Accordingly, when the participating terminal number increases and the display location number increases, the reception location number can also be increased. When the participating terminal number and the reception band decrease and the display location number decreases, the reception location number can also be decreased. Therefore, display location number=reception location number is satisfied, and therefore wasteful usage of the reception band can be reduced.

After step S60, the layout determining unit 233 determines the lower value between the display location number determined in step S10 and the present participating terminal number, as the reception location number (step S80). In this case, the display location number determined in step S10 according to the increase in the reception band, may have increased with respect to the display location number before performing the process of FIG. 14 (that is, the display location number in the present conference screen 501) (the participating terminal number has not increased). When the display location number determined in step S10 has increased, the reception location number will also increase. On the other hand, there are no changes in the display location number determined in step S70, and therefore display location number <reception location number is satisfied.

The display location number is determined as described above, and therefore the layout determining unit 233 acquires layout information from the layout management table (step S90).

Furthermore, when the reception location number has increased, as described at step S12 of FIG. 13, the transmitting/receiving unit 11 of the transmitting terminal 10*aa* specifies the data ID of the transmitting terminal 10*ad*, and sends a reception request to the relay device 30. Note that when the reception location number has decreased, the transmitting/receiving unit 11 of the transmitting terminal 10*aa* reports the data ID that is not received anymore, to the relay device 30. The data ID that is not received anymore is determined based on the priority rank order table. Accordingly, wasteful usage of the reception band can be reduced.

A supplemental description is given for a case where the participating terminal number has not changed and the processes of steps S70 and S80 are performed. In the case where the processes of steps S70 and S80 are performed, the reception band has increased, and therefore display location number <reception location number is satisfied. In this state, the next timing of performing the process of FIG. 14 approaches. When the reception band is stable, the layout determining unit 233 determines there are no changes in the reception band in step S30. In this case, the processes of steps S50 and S60 are performed, and therefore the display location number determined in step S10 is adopted with respect to the increased reception band, and the display location number can be increased. Therefore, in the present embodiment, when it is confirmed that the reception band is stable in the state where the reception location number is increased, the display location number is increased. Therefore, frequent screen transitions can be reduced.

On the other hand, if the reception band is unstable when the next timing of performing the process of FIG. 14 approaches, the layout determining unit 233 determines that there has been a change in the reception band in step S30. Assuming that the reception band has decreased, the processes of steps S40, S50, and S60 are performed, and therefore the display location number determined in step S10 when the process of FIG. 14 is performed for the second time, is adopted. This display location number is determined with respect to the reception band that has decreased from the reception band, which has been determined to have increased in the first time (the previous time or a time in past) the process of FIG. 14 has been performed. Therefore, the display location number determined in step S50 remains to be the original number (that is, the display location number of the present conference screen 501 is maintained). The reception location number will also be the same as the display location number. Therefore, it is possible to reduce cases where the display location number of the conference screen 501 increases when the reception band temporarily increases.

Furthermore, according to the flowchart of FIG. 14, the display location number can be determined by the same processing procedures both in a case where the reception band changes and in a case where the reception band does not change.

SPECIFIC EXAMPLES

Figure 15:
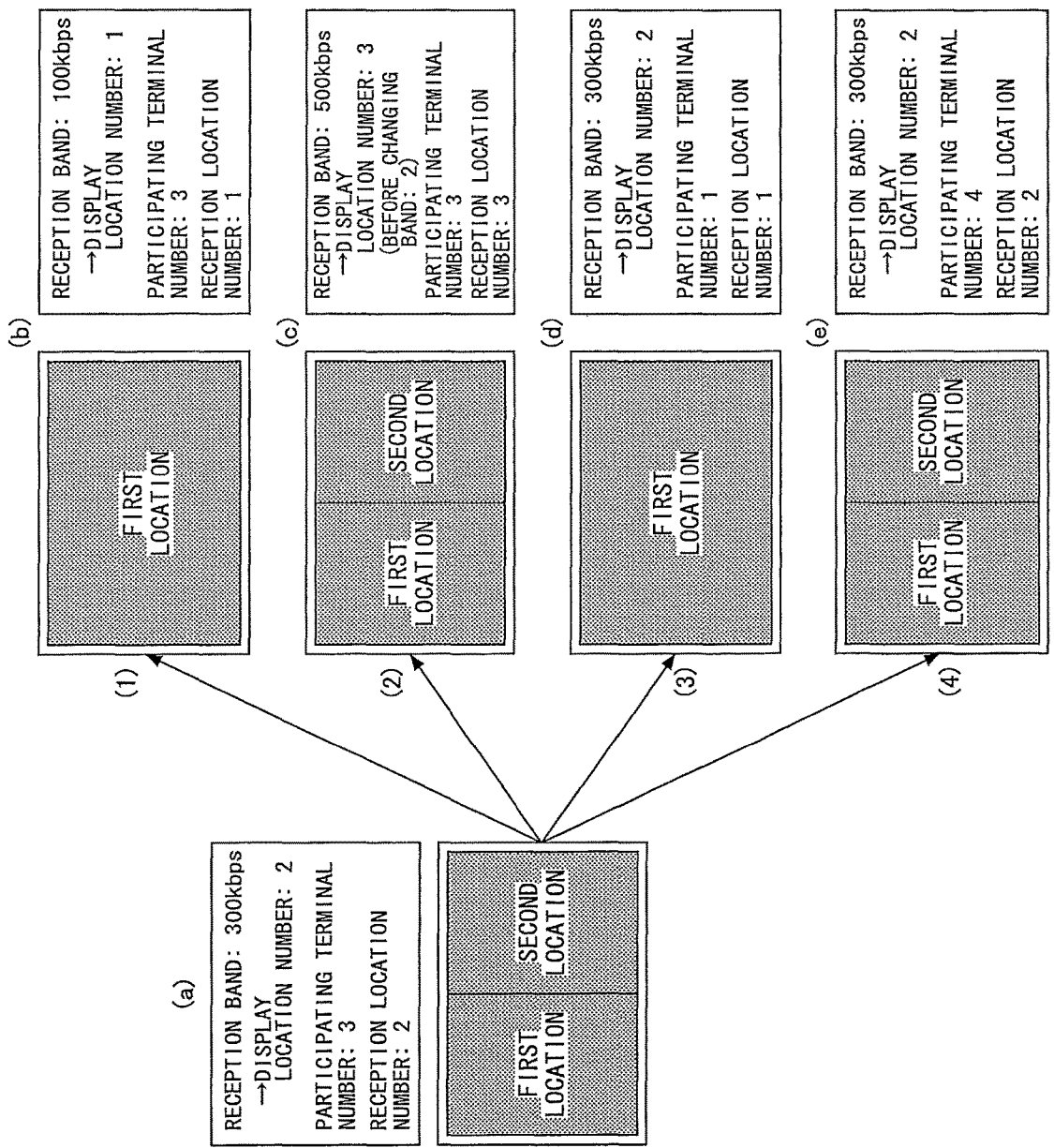
FIG. 15 is a diagram illustrating examples of layouts determined with respect to changes in the participating terminal number and the reception band according to an embodiment of the present invention.

FIG. 15 is a diagram illustrating examples of layouts determined with respect to changes in the participating terminal number and the reception band.

The present reception band is 300 kbps, the participating terminal number is 3, the present display location number determined based on the present reception band is 2, and the reception location number is also 2.

(1) When the Reception Band has Decreased

The display location number determined based on the reception band is 1. The participating terminal number remains to be 3.

Display location number 1<participating terminal number 3 is satisfied, and therefore the layout determining unit 233 determines the display location number to be 1. The reception location number is the same as the display location number, which is 1 (steps S50 and S60 of FIG. 14).

(2) When the reception band has increased

The display location number determined based on the reception band is 3. The participating terminal number remains to be 3. The display location number of the present conference screen 501 is 2; however, display location number 2 of the present conference screen 501<participating terminal number 3 is satisfied, and therefore the layout determining unit 233 determines the display location number to be 2. Both the display location number determined based on the reception band and the present participating terminal number are 3, and therefore the reception location number is 3 (steps S80 and S90 of FIG. 14).

(3) When Participating Terminal Number has Decreased

The display location number determined based on the reception band is 2. The participating terminal number decreases to 1.

Display location number 2<participating terminal number 1 is satisfied, and therefore the layout determining unit 233 determines the display location number to be 1. The reception location number is the same as the display location number, which is 1 (steps S50 and S60 of FIG. 14).

(4) When Participating Terminal Number has Increased

The display location number determined based on the reception band is 2. The participating terminal number increases to 4.

Display location number 2<participating terminal number 4 is satisfied, and therefore the layout determining unit 233 determines the display location number to be 2. The reception location number is the same as the display location number, which is 2 (steps S50 and S60 of FIG. 14).

Figure 16:
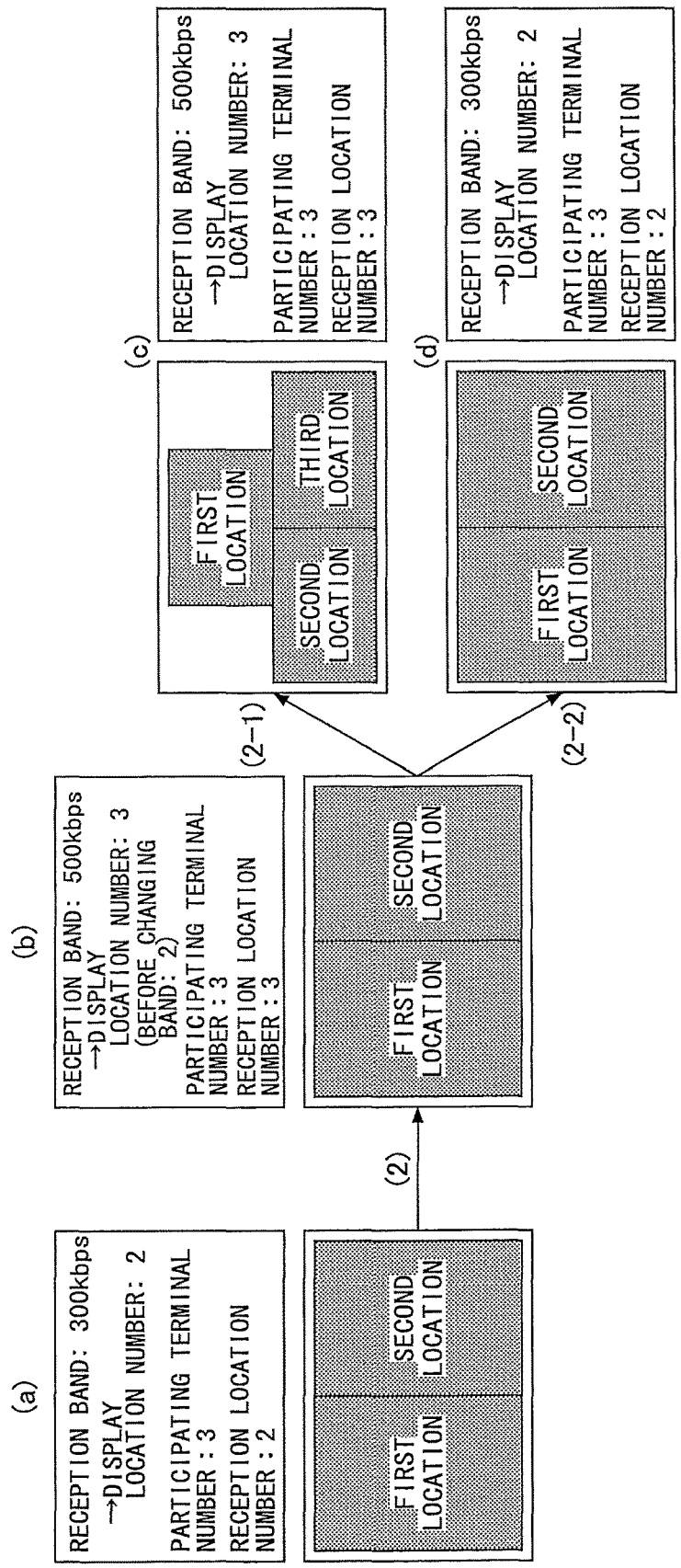
FIG. 16 is a diagram schematically illustrating the change in the layout after FIG. 15 (*b*) according to an embodiment of the present invention.

FIG. 16 is a diagram schematically illustrating the change in the layout after FIG. 15 (b) that is the layout updated the first time. FIG. 16 (a) is the same as FIG. 15 (a) and FIG. 16 (b) is the same as FIG. 15 (b).

(2-1) When Reception Band is Stable

The reception band is stable, and therefore the display location number determined based on the reception band is 3. The participating terminal number is 3.

Display location number 3=participating terminal number 3 is satisfied, and therefore the layout determining unit 233 determines the display location number to be 3. The reception location number is the same as the display location number, which is 3 (steps S50 and S60 of FIG. 14). Therefore, when the reception band increases and then becomes stable, the display location number of the conference screen 501 can be increased.

(2-2) When Reception Band has Decreased

The reception band has decreased, and therefore the display location number determined based on the reception band is 2. The participating terminal number is 3.

Display location number 2<participating terminal number 3 is satisfied, and therefore the layout determining unit 233 determines the display location number to be 2. The reception location number is the same as the display location number, which is 2 (steps S50 and S60 of FIG. 14). Therefore, when the reception band has increased but is unstable, it is possible to reduce increases or decreases in the display location number of the conference screen 501.

As described above, the transmission system 100 according to the present embodiment is capable of reducing frequent screen transitions, because even when the reception band increases, the display location number is not increased until it is confirmed that the reception band has become stable. Furthermore, when the reception band increases, it is determined whether the reception band is stable in the state where the reception location number is increased and content data is actually received. Therefore, the precision in determining whether the reception band is stable, can be improved. For example, in wireless communication, the maximum band is not that wide. However, when reception of data starts, communication of information other than image data may increase. Examples of information other than image data are reception confirmation (acknowledgement (ACK)) and resend requests. As a result, when reception of data starts, there are cases where the actual reception band is decreases than the expected reception band. The present embodiment addresses such circumstances by determining whether the reception band is stable before increasing the display location number to be displayed on the conference screen 501.

Modified Example

In the present embodiment, the transmitting terminal 10 determines the display location number; however, the transmission management system 50 or the relay device 30 may determine the display location number.

Figure 17:
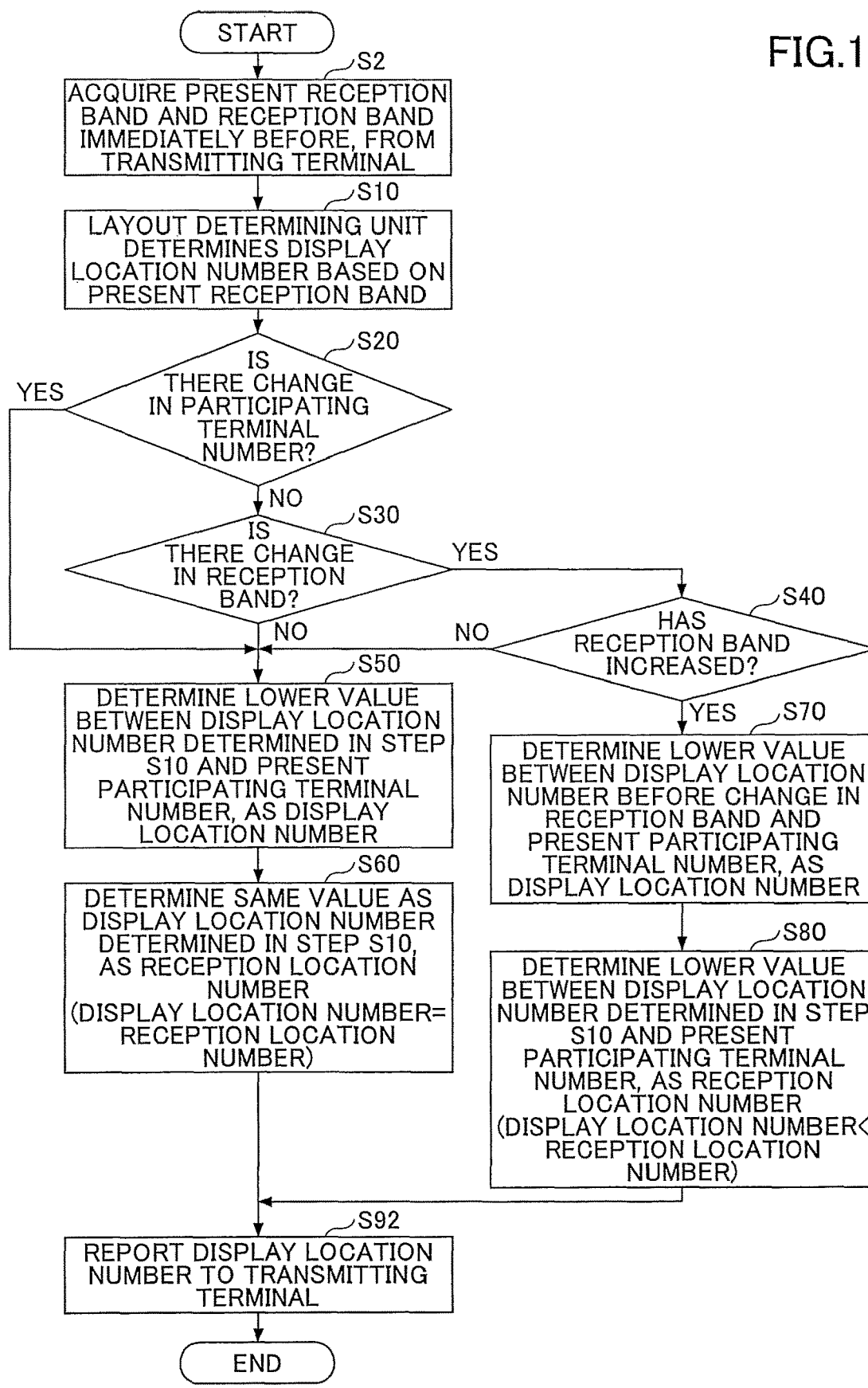
FIG. 17 is a flowchart of an example of procedures of determining the display location number by the transmission management system according to an embodiment of the present invention.

FIG. 17 is a flowchart of an example of procedures of determining the display location number by the transmission management system 50. Note that the differences between FIG. 17 and FIG. 14 are mainly described. The process of FIG. 17 is repeatedly executed for each transmitting terminal 10, similar to FIG. 14.

The transmitting/receiving unit 51 of the transmission management system 50 acquires the present reception band and the reception band immediately before the present reception band, from the transmitting terminal 10 (step S2). The transmission management system 50 may measure the reception band of the transmitting terminal 10. For example, the transmission management system 50 may measure the transmission band when some kind of data has been sent by the transmitting/receiving unit 51 of the transmission management system 50, and set the measured transmission band as the reception band of the transmitting terminal 10. In another example, the transmission management system 50 may input a function in the transmission band to calculate the reception band.

The transmission management system 50 acquires the display location number based on the present reception band (step S10). In this case, the transmission management system 50 includes the layout determining unit 233 and the layout management DB 1002, and the layout determining unit 233 acquires the display location number based on the present reception band.

The subsequent processes of steps S20 through S80 may be the same as FIG. 14. Next, the transmission management system 50 reports the display location number to the transmitting terminal (step S92).

As described above, the transmission management system 50 and the relay device 30 may control the display location number and the reception location number.

OTHER APPLICATION EXAMPLES

The information processing apparatus, the image display method, and the communication system are not limited to the specific embodiments described in the detailed description, and variations and modifications may be made without departing from the spirit and scope of the present invention.

For example, in the present embodiment, when the reception band decreases, the display location number is changed without waiting for the reception band to become stable. However, when the reception band decreases, it may be determined whether the reception band is stable, and change the display location number when the reception band is stable.

Furthermore, in the present embodiment, the transmitting terminal 10 performs communication via the relay device 30; however, the transmitting terminal 10 may perform communication without involving the relay device 30. As an example of a communication protocol of such a communication method, Web Real-Time Communication (WebRTC) is known. In this case also, the display location number can be determined according to the reception band.

Furthermore, in the configuration example of FIG. 7, etc., the configuration is divided according to the main functions for facilitating the understanding of processes by the transmission management system 50 and the transmitting terminal 10. However, the present invention is not limited by the way of dividing the configuration in units of processes or the names of the units. The processes of the transmission management system 50 and the transmitting terminal 10 may be further divided into more processing units according to processing contents. Furthermore, a single processing unit may be divided to include even more processes.

Furthermore, as a matter of convenience, in the present embodiment, the transmission management system 50 and the relay device 30 are described as separate devices; however, there may be a single device in which the functions of both the transmission management system 50 and the relay device 30 are integrated to provide the functions of the transmission management system 50 and the relay device 30.

Furthermore, the transmission system 100 may include a plurality of transmission management systems 50, and the functions of the transmission management system 50 may be distributed and disposed in a plurality of servers.

Furthermore, one or more of the databases included in the storage unit 5000 of the transmission management system 50 may be provided in the communication network 2. The same applies to the databases included in the storage unit 1000 of the transmitting terminal 10.

The display 120 is described as an example of a display device; however, any kind of display device may be used as long as images can be displayed, such as a projector, a Heads Up Display (HUD), a TV received, and a car navigation terminal.

According to one embodiment of the present invention, an information processing apparatus in which frequent screen transitions are reduced, can be provided.

The information processing apparatus, the image display method, and the communication system are not limited to the specific embodiments described in the detailed description, and variations and modifications may be made without departing from the spirit and scope of the present invention.

What is claimed is:
1. An information processing apparatus for displaying, on a screen, one or more images respectively received from one or more other information processing apparatuses via a network, the information processing apparatus comprising:
  a receiver configured to receive at least a portion of the one or more images from the one or more other information processing apparatuses;
  circuitry configured to, during a current updating cycle:
    acquire current reception band information of a reception band of the network;
    determine a temporary number of the one or more images to be displayed on the screen based on the current reception band information;
    set a display location number of the one or more images to be displayed on the screen based on the temporary number, when the current reception band information and previous reception band information of the reception band of the network acquired during a previous updating cycle indicate that the reception band has not increased; and
    set the display location number of the one or more images to be displayed on the screen based on a previous display location number of the one or more images that is set during the previous updating cycle, when the current reception band information and the previous reception band information of the reception band of the network acquired during the previous updating cycle indicate that the reception band has increased; and
  a display processor configured to display the display location number of the one or more images on the screen upon completion of the current updating cycle.

2. The information processing apparatus according to claim 1, wherein the circuitry is configured to, during the current updating cycle, set the temporary number of the one or more images as the display location number of the one or more images to be displayed on the screen, when the current reception band information and the previous reception band information of the reception band of the network acquired during the previous updating cycle indicate that the reception band has not increased.

3. The information processing apparatus according to claim 2, wherein
the receiver is configured to receive the temporary number of the one or more images upon completion of the current updating cycle, when the current reception band information and the previous reception band information of the reception band of the network acquired during the previous updating cycle indicate that the reception band has increased.

4. The information processing apparatus according to claim 2, wherein the circuitry is further configured to, during the current updating cycle:
acquire a participating number of the one or more other information processing apparatuses capable of communicating with the information processing apparatus; and
set a lower value between the previous display location number of the one or more images and the acquired participating number of the one or more other information processing apparatuses as the display location number of the one or more images to be displayed on the screen, when the current reception band information and the previous reception band information of the reception band of the network acquired during the previous updating cycle indicate that the reception band has increased.

5. The information processing apparatus according to claim 4, wherein the circuitry is configured to, during the current updating cycle, set a lower value between the temporary number of the one or more images and the acquired participating number of the one or more other information processing apparatuses as the display location number of the one or more images to be displayed on the screen, when the current reception band information and the previous reception band information of the reception band of the network acquired during the previous updating cycle indicate that the reception band has not increased.

6. The information processing apparatus according to claim 4, wherein the circuitry is configured to, during the current updating cycle, set a lower value between the temporary number of the one or more images and the acquired participating number of the one or more other information processing apparatuses as a reception number of the one or more images to be received by the receiver.

7. The information processing apparatus according to claim 1, wherein the circuitry is configured to, during the current updating cycle, set the display location number of the one or more images as a reception number of the one or more images to be received by the receiver.

8. A method performed by an information processing apparatus for displaying, on a screen, one or more images respectively received from one or more other information processing apparatuses via a network, the method comprising, during a current updating cycle:
receiving at least a portion of the one or more images from the one or more other information processing apparatuses;
acquiring current reception band information of a reception band of the network;
determining a temporary number of the one or more images to be displayed on the screen based on the current reception band information;
setting a display location number of the one or more images to be displayed on the screen based on the temporary number, when the current reception band information and previous reception band information of the reception band of the network acquired during a previous updating cycle indicate that the reception band has not increased; and
setting the display location number of the one or more images to be displayed on the screen based on a previous display location number of the one or more images that is set during the previous updating cycle, when the current reception band information and the previous reception band information of the reception band of the network acquired during the previous updating cycle indicate that the reception band has increased,
wherein the method further comprises displaying the display location number of the one or more images on the screen upon completion of the current updating cycle.

9. A communication system comprising:
a receiver configured to receive at least a portion of one or more images from one or more respective information processing apparatuses communicating via a network;
circuitry configured to, during a current updating cycle:
acquire current reception band information of a reception band of the network;
determine a temporary number of the one or more images to be displayed on a screen based on the current reception band information;
set a display location number of the one or more images to be displayed on the screen based on the temporary number, when the current reception band information and previous reception band information of the reception band of the network acquired during a previous updating cycle indicate that the reception band has not increased; and
set the display location number of the one or more images to be displayed on the screen based on a previous display location number of the one or more images that is set during the previous updating cycle, when the current reception band information and the previous reception band information of the reception band of the network acquired during the previous updating cycle indicate that the reception band has increased; and
a display processor configured to display the display location number of the one or more images on the screen upon completion of the current updating cycle.

10. The method according to claim 8, further comprising, during the current updating cycle:
acquiring a participating number of the one or more other information processing apparatuses capable of communicating with the information processing apparatus,
wherein setting the display location number when the current reception band information and the previous reception band information of the reception band of the network acquired during the previous updating cycle indicate that the reception band has increased includes setting a lower value between the previous display location number of the one or more images and the acquired participating number of the one or more other information processing apparatuses as the display location number of the one or more images to be displayed on the screen.

* * * * *